(12) United States Patent
Matsuura

(10) Patent No.: US 11,645,149 B2
(45) Date of Patent: May 9, 2023

(54) INFORMATION PROCESSING SYSTEM, STORAGE DEVICE, AND HOST

(71) Applicant: KIOXIA CORPORATION, Tokyo (JP)

(72) Inventor: Mato Matsuura, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/409,950

(22) Filed: Aug. 24, 2021

(65) Prior Publication Data

US 2022/0291994 A1    Sep. 15, 2022

(30) Foreign Application Priority Data

Mar. 9, 2021  (JP) ................. 2021-037486

(51) Int. Cl.
*G06F 3/06*    (2006.01)
*G06F 11/10*   (2006.01)
(Continued)

(52) U.S. Cl.
CPC ........ *G06F 11/1068* (2013.01); *G06F 3/0619* (2013.01); *G06F 3/0659* (2013.01);
(Continued)

(58) Field of Classification Search
CPC .. G06F 11/1068; G06F 3/0619; G06F 3/0659; G06F 3/0679; G06F 11/0772; G06F 12/0882; G06F 11/1048; G06F 11/1004
(Continued)

(56) References Cited

U.S. PATENT DOCUMENTS 8,145,941 B2    3/2012  Jacobson
8,234,542 B2 *  7/2012  Katsuragi ........... G06F 11/0727
                                                         714/764
(Continued)

FOREIGN PATENT DOCUMENTS

JP        4668970 B2      4/2011
TW     202107474 A  *    2/2021  .......... G06F 11/1004
(Continued)

OTHER PUBLICATIONS

Jedec Solid State Technology Association "Jedec Standard Universal Flash Storage (UFS) Version 3.1 JESD220E (Revision of JESD220D, Jan. 2018)" Jan. 2020, P104 (p. 88), P107 (p. 91) (421 pages).

*Primary Examiner* — Kyle Vallecillo
*Assistant Examiner* — Enam Ahmed
(74) *Attorney, Agent, or Firm* — Kim & Stewart LLP

(57) ABSTRACT

In general, according to an embodiment, a storage device includes a non-volatile memory and a controller. The non-volatile memory includes a plurality of pages, each of the pages including a data area of a first size and a redundant area of a second size smaller than the first size. The controller is configured to receive, from a host, a write command, receive, from the host, transfer data associated with the write command. The transfer data includes write data of the first size appended with a first error detection code for the write data. The controller is further configured to store the write data into the data area of one of the pages and the first error detection code into the redundant area of the one of the pages.

16 Claims, 24 Drawing Sheets

(51) Int. Cl.
*G06F 11/07* (2006.01)
*G06F 12/0882* (2016.01)

(52) U.S. Cl.
CPC ........ *G06F 3/0679* (2013.01); *G06F 11/0772* (2013.01); *G06F 12/0882* (2013.01)

(58) Field of Classification Search
USPC ........................................................ 714/764
See application file for complete search history.

(56) References Cited

U.S. PATENT DOCUMENTS

| | | | | |
|---|---|---|---|---|
| 8,245,101 | B2* | 8/2012 | Olbrich | G06F 13/28 |
| | | | | 714/6.24 |
| 8,949,684 | B1* | 2/2015 | Shalvi | G11C 5/005 |
| | | | | 714/766 |
| 9,389,952 | B2 | 7/2016 | Yu et al. | |
| 10,102,060 | B2 | 10/2018 | Koseki et al. | |
| 2013/0232391 | A1* | 9/2013 | Asano | G11C 29/52 |
| | | | | 714/764 |
| 2013/0297894 | A1* | 11/2013 | Cohen | G06F 12/00 |
| | | | | 711/154 |
| 2015/0082122 | A1* | 3/2015 | Udipi | G06F 11/1064 |
| | | | | 714/764 |
| 2017/0070241 | A1* | 3/2017 | Kaku | H03M 13/2906 |
| 2017/0075603 | A1* | 3/2017 | Trantham | G06F 11/1008 |
| 2018/0039538 | A1* | 2/2018 | Freikorn | G06F 11/1048 |

FOREIGN PATENT DOCUMENTS

| | | |
|---|---|---|
| WO | 2015/029230 A1 | 3/2015 |
| WO | 2015/075837 A1 | 5/2015 |

* cited by examiner

US 11,645,149 B2

INFORMATION PROCESSING SYSTEM, STORAGE DEVICE, AND HOST

CROSS-REFERENCE TO RELATED APPLICATION

This application is based upon and claims the benefit of priority from Japanese Patent Application No. 2021-037486, filed Mar. 9, 2021, the entire contents of which are incorporated herein by reference.

FIELD

Embodiments described herein relate generally to an information processing system, a storage device, and a host.

BACKGROUND

In recent years, storage devices such as solid-state drives (SSD) and hard disk drives (HDD) have become more widespread. These storage devices are used as a storage for information processing devices such as a personal computer (PC) and a server. In an information processing system in which an information processing device and a storage device are connected, the information processing device is called a host.

In an SSD conforming to the universal flash storage (UFS) specification, data is protected between the host and the SSD by a cyclic redundancy check (CRC) on a communication protocol conforming to the UFS specification. Furthermore, between a NAND-type flash memory (NAND memory) in the SSD and the controller that controls the NAND memory, data is protected by an error correcting code (ECC) generated by the controller. However, for writing data to the NAND memory, or reading data from the NAND memory, the data is not protected from the time it is input to the controller to the time it is output from the controller. That is, the data passing through the controller is not protected during transit. Accordingly, when an error occurs in the data due to a failure inside the controller, the error may not be detected.

DETAILED DESCRIPTION

One or more embodiments provide a storage device and a host capable of protecting data for the entire transmission path of data while preventing deterioration of write efficiency.

In general, according to an embodiment, a storage device includes a non-volatile memory and a controller. The non-volatile memory includes a plurality of pages, each of the pages including a data area of a first size and a redundant area of a second size smaller than the first size. The controller is configured to receive, from a host, a write command, receive, from the host, transfer data associated with the write command. The transfer data includes write data of the first size appended with a first error detection code for the write data. The controller is further configured to store the write data into the data area of one of the pages and the first error detection code into the redundant area of the one of the pages.

Hereinafter, certain example embodiments will be described with reference to the drawings.

As described above, in an SSD at the time of writing data to the NAND memory, at the time of reading data from the NAND memory, or during similar operations, the data is not protected from the time it is input to the controller to the time it is output from the controller. That is, the data passing through the controller is not protected during transit through the controller. Accordingly, when an error occurs in the data due to a failure inside the controller, the error may not be detected.

When the SSD is equipped with a function for detecting a data error due to a failure inside the controller, the cost will increase and the response time will increase.

In addition, when data on the entire data transmission path including the inside of the controller is to be protected by adding a consistent error detection code (EDC) or ECC to the data from the host to the NAND memory in the SSD, the simple addition of the EDC or ECC to the data will deteriorate the write efficiency of the SSD.

Further, according to the rule related to a data size of a command issued by the host, when the EDC or ECC is to be added to data of a specified size and the size increases out of the specified permissible size range, communication may not be done between the host and the SSD.

The present embodiment relates to an information processing system capable of protecting data over the entire data transmission path while preventing deterioration of write efficiency.

Figure 1:
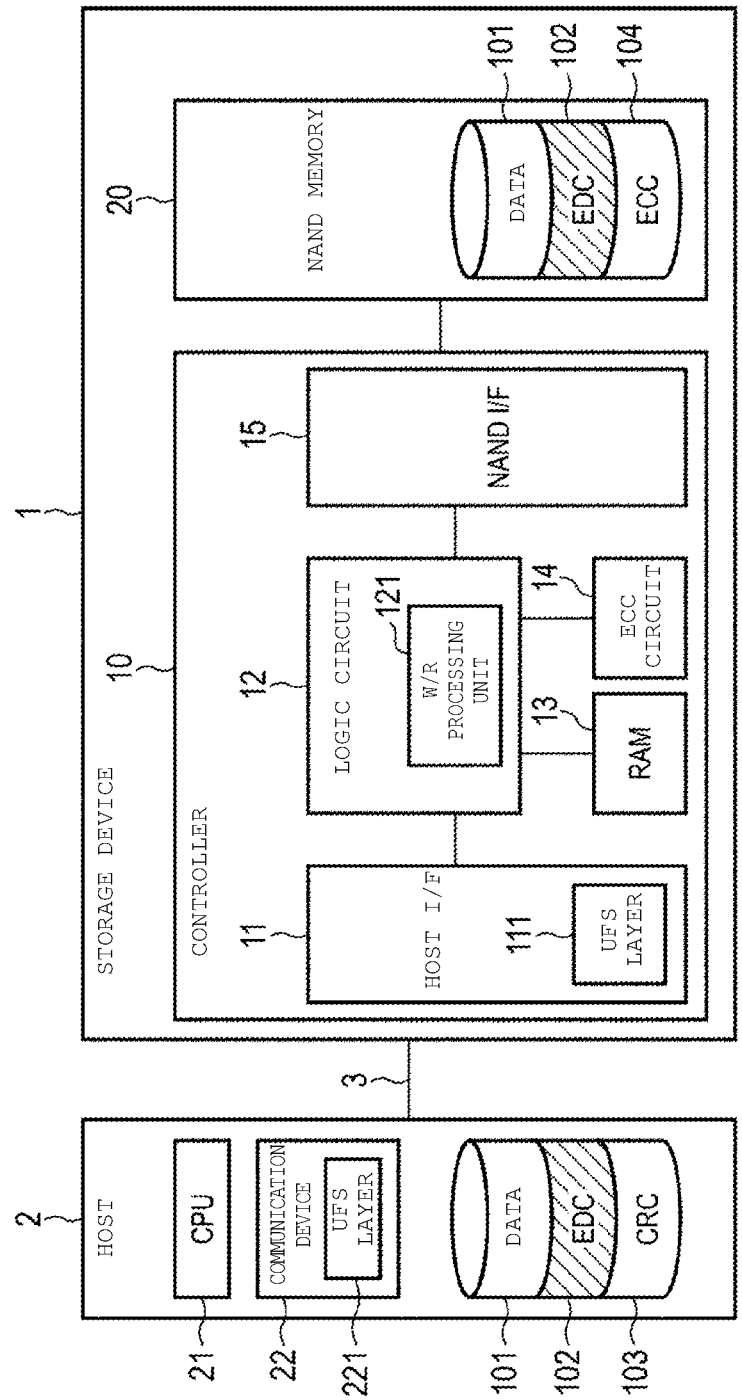
FIG. 1 is a diagram illustrating a configuration example of an information processing system of an embodiment.

FIG. 1 is a diagram illustrating a configuration example of an information processing system 100 of the present embodiment. The information processing system 100 includes a storage device 1, a host 2, and an interface 3 that connects the storage device 1 and the host 2. The interface 3 conforms to, for example, the UFS specification. The storage device 1 and the host 2 communicate with each other by, for example, a communication protocol conforming to the UniPro™ specification. The host 2 stores a small computer system interface (SCSI) command in a format conforming to the SCSI specification in a UFS protocol information unit (UPIU), which is a packet in a format conforming to the UFS specification, and transmits the SCSI command to the storage device 1. The storage device 1 receives the UPIU from the host 2, extracts the SCSI command in the UPIU, and executes processing in accordance with the SCSI command.

The storage device 1 can be implemented as, for example, an SSD conforming to the UFS specification. The storage device 1 includes a controller 10 and a NAND flash memory (NAND memory) 20.

The controller 10 is configured as, for example, a system on a chip (SoC). The controller 10 executes a write operation of data transmitted from the host 2 to the NAND memory 20, a read operation of data requested by the host 2 from the NAND memory 20, or the like according to a command (SCSI command) issued by the host 2.

The controller 10 has a host interface 11, a logic circuit 12, a RAM 13, an ECC circuit 14, and a NAND interface 15.

The host interface 11 controls communication to and from the host 2 via the interface 3. The host interface 11 has a UFS layer 111. The UFS layer 111 communicates the UPIU to and from the UFS layer 221 on the host 2 side. The UFS layer 111 has a function of inspecting the UPIU communicated to and from the UFS layer 221 on the host 2 side using CRC. For example, when an error occurs in the data stored in the UPIU during the transfer from the UFS layer 221 of the host 2 to the UFS layer 111 of the storage device 1, this error is detected by the UFS layer 111. Further, the UFS layer 111 generates and adds a CRC, which is for the UFS layer 221 of the host 2 to inspect the UPIU, to the corresponding UPIU transmitted to the UFS layer 221 of the host 2.

The logic circuit 12 controls the operation of the storage device 1 in an integrated manner. Specifically, the logic circuit 12 controls the host interface 11, the RAM 13, the ECC circuit 14, and the NAND interface 15. The logic circuit 12 has a W (write)/R (read) processing unit 121 that executes a write operation of data to the NAND memory 20 and a read operation of data from the NAND memory 20. When a write command from the host 2 is received via the host interface 11, the W/R processing unit 121 receives the data transmitted from the host 2 using the RAM 13 as a buffer. The W/R processing unit 121 instructs the ECC circuit 14 to generate an ECC for protecting this data, and writes the generated ECC to the NAND memory 20 via the NAND interface 15 corresponding to the data from the host 2. When a read command from the host 2 is received via the host interface 11, the W/R processing unit 121 reads the data requested by the host 2 from the NAND memory 20 together with the ECC via the NAND interface 15. The read data is temporarily stored in the RAM 13. The W/R processing unit 121 instructs the ECC circuit 14 to perform inspection of the data read from the NAND memory 20 and stored in the RAM 13 using the ECC. When the ECC circuit 14 notifies that the data is correct, the W/R processing unit 121 transmits the corresponding data to the host 2 via the host interface 11. In other words, at the time of reading data from the NAND memory 20, the W/R processing unit 121 detects a data error by inspection using the ECC. When an error occurs at the time of writing data to the NAND memory 20, a status error is output from the NAND memory 20. As a result, the W/R processing unit 121 detects the occurrence of an error.

The W/R processing unit 121 is implemented, for example, by executing a program on a processor or the like in the logic circuit 12. Alternatively, the W/R processing unit 121 may be implemented as hardware such as an electric circuit.

In this way, data is protected between the host 2 and the storage device 1 using the CRC on the communication protocol. Further, between the controller 10 and the NAND memory 20 in the storage device 1, data is protected using the ECC generated by the ECC circuit 14. The information processing system 100 of the present embodiment can detect an error of data occurring in the controller 10 of the storage device 1. More specifically, a mechanism is implemented that can protect data for the entire data transmission path while preventing deterioration of the write efficiency of the storage device 1. That is, a mechanism is implemented in which an EDC 102 is added to the data 101 to be written into the storage device 1 by the processing of the host 2 without deteriorating the write efficiency of the storage device 1, and the consistent EDC 102 can be added from the host 2 to the NAND memory 20 in the storage device 1. Accordingly, in the information processing system 100 of the present embodiment, the UFS layer 221 of the host 2, and the UFS layer 111 and the W/R processing unit 121 of the storage device 1 perform an operation. This point will be described below. Although the EDC 102 is illustrated in FIG. 1, ECC may be used instead of EDC. That is the EDC 102 may also enable correction of an error, as well as detection of the error. Further, a CRC 103 and an ECC 104 in FIG. 1 protect the data 101 +the EDC 102. The EDC 102 is generated, for example, at the UFS layer 221 that receives a SCSI command from the SCSI layer at the host 2. The UFS layer 221 of the host 2 also executes inspection of the data 101 read from the storage device 1 using the EDC 102.

The RAM 13 is, for example, an SRAM. As described above, the role as a buffer for temporarily storing data may be transferred to a DRAM by providing the DRAM outside the controller 10.

The ECC circuit 14 generates the ECC of data (data 101+EDC 102) written in the NAND memory 20 according to the instruction of the W/R processing unit 121 of the logic circuit 12, or determines whether the data read from the NAND memory 20 is correct using the ECC read from the NAND memory 20 together with the data.

The NAND interface 15 controls the communication of data with the NAND memory 20.

The host 2 is, for example, a drive recorder mounted on a vehicle. The host 2 records, for example, a captured image (data 101) of the front and rear of the vehicle body in the storage device 1. The host 2 has a CPU 21 and a communication device 22. The CPU 21 controls the operation of the host 2 in an integrated manner. Specifically, the CPU 21 controls each component in the host 2 including the communication device 22.

The communication device 22 controls communication to and from the storage device 1 via the interface 3. The communication device 22 may be referred to as a communication interface. The UFS layer 221 described above is provided in the communication device 22. The UFS layer 221 communicates the UPIU to and from the UFS layer 111 on the storage device 1 side. The UFS layer 221 has a function of inspecting the UPIU communicated to and from the UFS layer 111 on the storage device 1 side using CRC. For example, when an error occurs in the data stored in the UPIU during the transfer from the UFS layer 111 of the storage device 1 to the UFS layer 221 of the host 2, this error is detected by the UFS layer 221. Further, the UFS layer 221 generates and adds a CRC, which is for the UFS layer 111 of the storage device 1 to inspect the UPIU, to the corresponding UPIU transmitted to the UFS layer 111 of the storage device 1.

Here, with reference to FIG. 2, the advantage of adding the consistent EDC 102 to the data 101 from the host 2 to the NAND memory 20 in the storage device 1 will be described.

Figure 2:
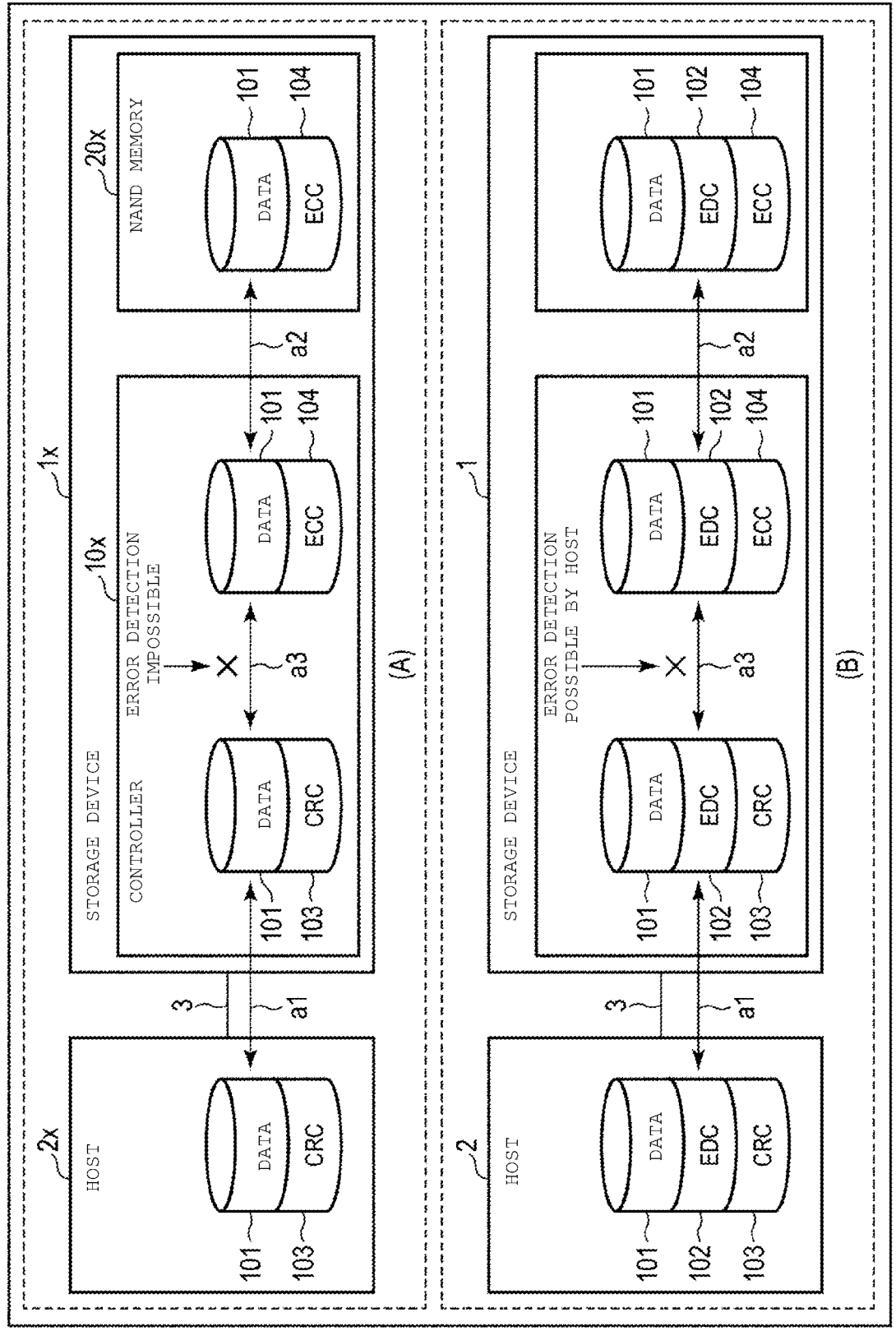
FIG. 2 is a diagram to explain an advantage of adding a consistent EDC to data from a host to a NAND memory in a storage device in an information processing system of an embodiment.

(A) of FIG. 2 illustrates an example of data protection in an information processing system in which the EDC 102 is not added to the data 101. In this example, the data 101 is protected with the CRC 103 in a communication a1 between a host 2x and a storage device 1x. Further, the data 101 is protected with the ECC 104 in a communication a2 between a controller 10x and a NAND memory 20x in the storage device 1. However, the data 101 is not protected in a communication a3 from the input to the controller 10x to the output from the controller 10x at the time of writing the data 101 into the NAND memory 20x and at the time of reading the data 101 from the NAND memory 20x, or the like. That is, the data 101 passing through the controller 10x is not protected. Accordingly, even if an error occurs in the data 101 due to a failure inside the controller 10x, the error cannot be detected.

On the other hand, (B) of FIG. 2 illustrates an example of data protection in the information processing system 100 of the present embodiment in which the EDC 102 is added to the data 101. In this example, the data 101 and the EDC 102 are protected with the CRC 103 in the communication a1 between the host 2 and the storage device 1. Further, the data 101 and the EDC 102 are protected with the ECC 104 in the communication a2 between the controller 10 and the NAND memory 20 in the storage device 1. The data 101 is protected with the EDC 102 in the communication a3 from the input to the controller 10 to the output from the controller 10 at the time of writing the data 101 into the NAND memory 20 and at the time of reading the data 101 from the NAND memory 20, or the like. When an error occurs in the data 101 due to a failure inside the controller 10, the host 2 can detect the error using the EDC 102. When the EDC 102 is an ECC, the error can be also corrected.

Next, with reference to FIG. 3, a storage method of the EDC 102 added to the data 101 in the information processing system 100 of the present embodiment will be described.

The area of the NAND memory 20 of the storage device 1 is managed in units called a page b10, each thereof including a data area b11 and a redundant area b12. In other words, the controller 10 of the storage device 1 executes the write of the data 101 to the NAND memory 20 and the read of the data 101 from the NAND memory 20 by a page unit. The data area is, for example, 4K byte.

Further, the operating system (OS) executed by the CPU 21 of the host 2 manages the data 101 on the storage device 1 in units of 4K byte, which is the size of the data area of each page. Accordingly, the EDC 102 for protecting the data 101 is generated for each 4K byte of the data 101. Depending on the type or setting of an OS and a file system, the data 101 on the storage device 1 may be managed in units of, for example, 512 byte other than 4K byte.

When the EDC 102 is simply added to the data 101 and the data 101+ the EDC 102 is stored in the data area of the page, the data size is 4K byte+α. α is a fraction that is less than 4K byte. As a result, writing to two pages is required, although only one page is sufficient for the data 101, and the write efficiency of the storage device 1 may be lowered.

Figure 3:
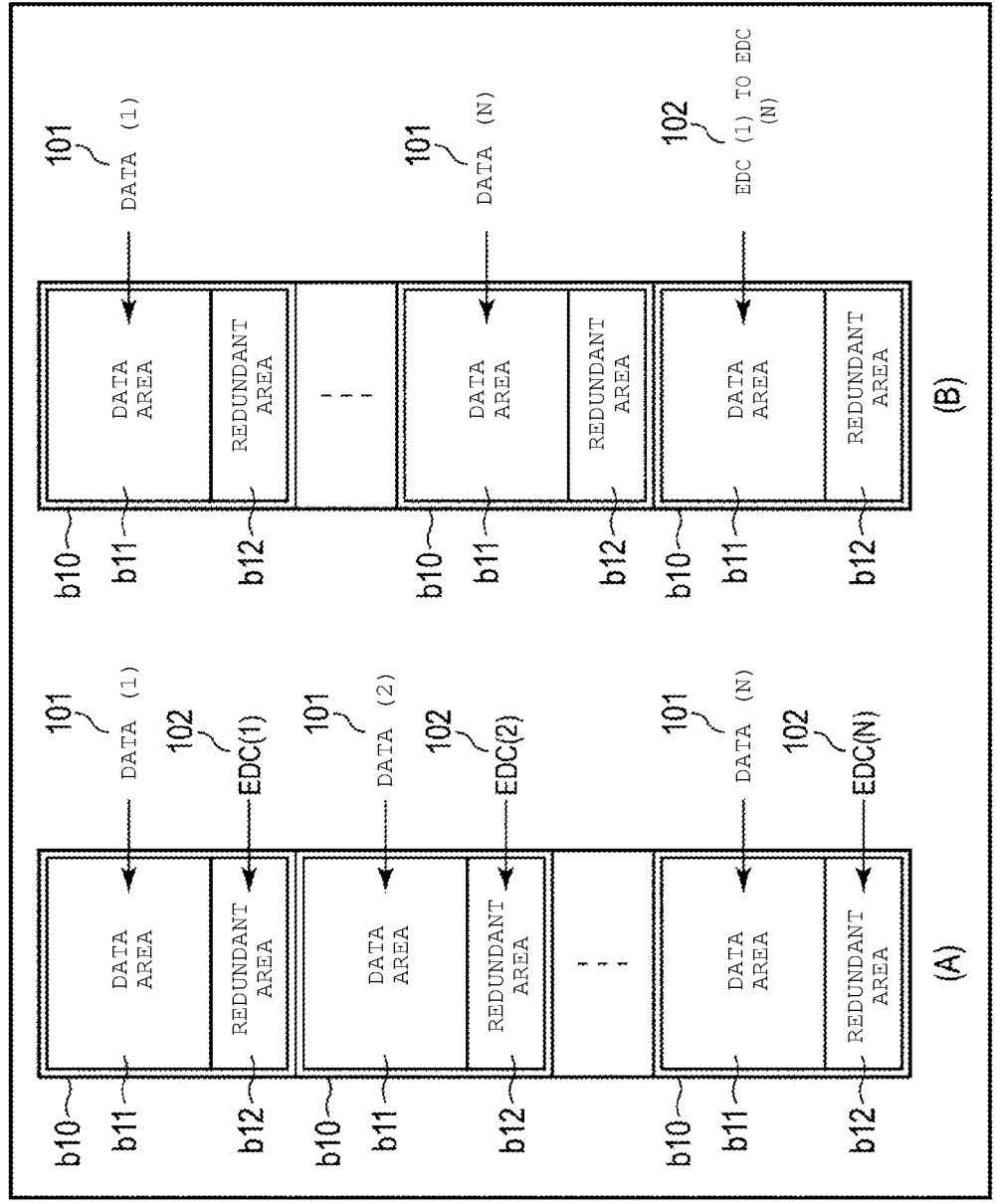
FIG. 3 is a diagram illustrating storage methods of EDC added to data in an information processing system of an embodiment.

(A) of FIG. 3 illustrates a first storage method of the EDC 102 added to the data 101 in the information processing system 100 of the present embodiment.

As illustrated in (A) of FIG. 3, in the first storage method in the information processing system 100 of the present embodiment, the EDC 102 (1 to N) generated for each 4K byte of data 101 (1 to N) is stored in the redundant area on the same page as the data 101.

Further, (B) of FIG. 3 illustrates a second storage method of the EDC 102 added to the data 101 in the information processing system 100 of the present embodiment.

As illustrated in (B) of FIG. 3, the second storage method in the information processing system 100 of the present embodiment collects the EDC 102 within a range of 4K byte and stores the EDC 102 in a data area on a page different from the data 101.

The storage of the EDC 102 as illustrated in (A) of FIG. 3 and (B) of FIG. 3 is controlled by the W/R processing unit 121 of the controller 10 that executes a write operation to the NAND memory 20 and a read operation from the NAND memory 20. That is, the W/R processing unit 121 performs an operation for storing the EDC 102 as illustrated in (A) of FIG. 3 and (B) of FIG. 3.

In the first storage method illustrated in (A) of FIG. 3, the number of pages consumed (i.e., pages of which data area is used) is not increased and only the write of the EDC 102 to the redundant area b12 is added, so that a decrease in the write efficiency of the storage device 1 can be prevented. In the second storage method illustrated in (B) of FIG. 3, the increase in the number of pages consumed and the addition of the write for the EDC 102 are also minimized, so that a decrease in the write efficiency of the storage device 1 can be prevented.

Next, a description will be given relating to the operation performed by the UFS layer 221 of the host 2 and the UFS layer 111 of the storage device 1 for enabling the storage of the data 101 and the EDC 102 as illustrated in (A) of FIG. 3 and (B) of FIG. 3.

As described above, the host 2 stores the SCSI command (write command/read command) for requesting the write and read of data in the UPIU and transmits the SCSI command to the storage device 1. SCSI defines that data is handled in units of logical blocks. At present, the logical block address (LBA) size is generally in units of 4K byte. Further, in UFS, the LBA size is defined as a power of 2 of 4K byte. Accordingly, the size of the data communicated by the SCSI command between the host 2 and the storage device 1 that are connected by the interface 3 conforming to the UFS specification, is limited to a multiple size of 4K byte. That is, it is difficult to communicate the data in a multiple size that does not match a multiple of 4K byte, that is a multiple of 4K byte+$\alpha$. On the other hand, the UPIU that contains the SCSI command can specify the data size of the communication data in units of 1 byte. The information processing system 100 of the present embodiment utilizes this point to implement the communication of the data 101+ the EDC 102 having a data size of 4K byte+$\alpha$ between the host 2 and the storage device 1.

Figure 4:
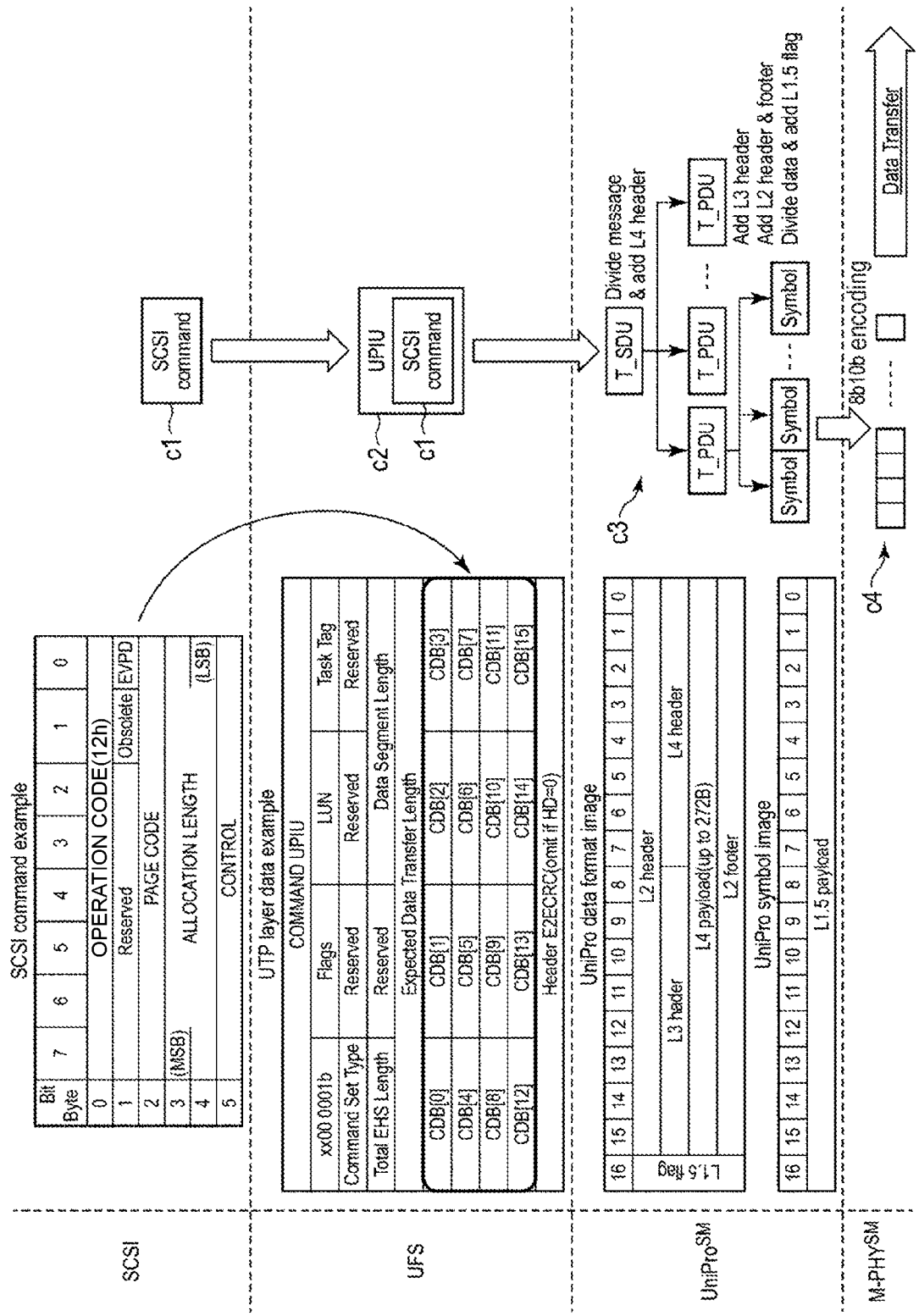
FIG. 4 is a diagram illustrating a flow of data in a device using a communication protocol conforming to the UFS specification.

First, with reference to FIG. 4, a flow of data in the device at the time of communication in a communication protocol conforming to the UFS specification will be described. FIG. 4 illustrates a flow of data in the host 2 when the SCSI command issued by the host 2 is transmitted to the storage device 1.

A SCSI command c1 issued by the CPU 21 of the host 2 is passed to the communication device 22 that controls communication to and from the storage device 1 connected by the interface 3 conforming to the UFS specification by the communication protocol conforming to the UniPro specification. The UFS layer 221 of the communication device 22 stores the SCSI command in a UPIU c2. The communication device 22 converts the UPIU containing the SCSI command into a data group c3 in a format conforming to the UniPro specification. M-PHY™ is used for the electrical interface for UFS, and the communication device 22 applies 8-bit-10-bit encoding to the converted data group c4 and performs serial transfer toward the storage device 1.

On the other hand, the storage device 1 extracts the SCSI command from the UPIU in the reverse flow of the flow of data illustrated in FIG. 4. Specifically, the host interface 11 performs 8-bit-10-bit decoding with respect to the data serially transferred from the host 2 and acquires the data group c3 in a format conforming to the UniPro specification. The host interface 11 converts the data group into the UPIU in a format conforming to the UFS specification, and extracts the SCSI command from the converted UPIU.

Next, with reference to FIG. 5, the flow of data between devices at the time of communication in a communication protocol conforming to the UFS specification will be described.

Figure 5:
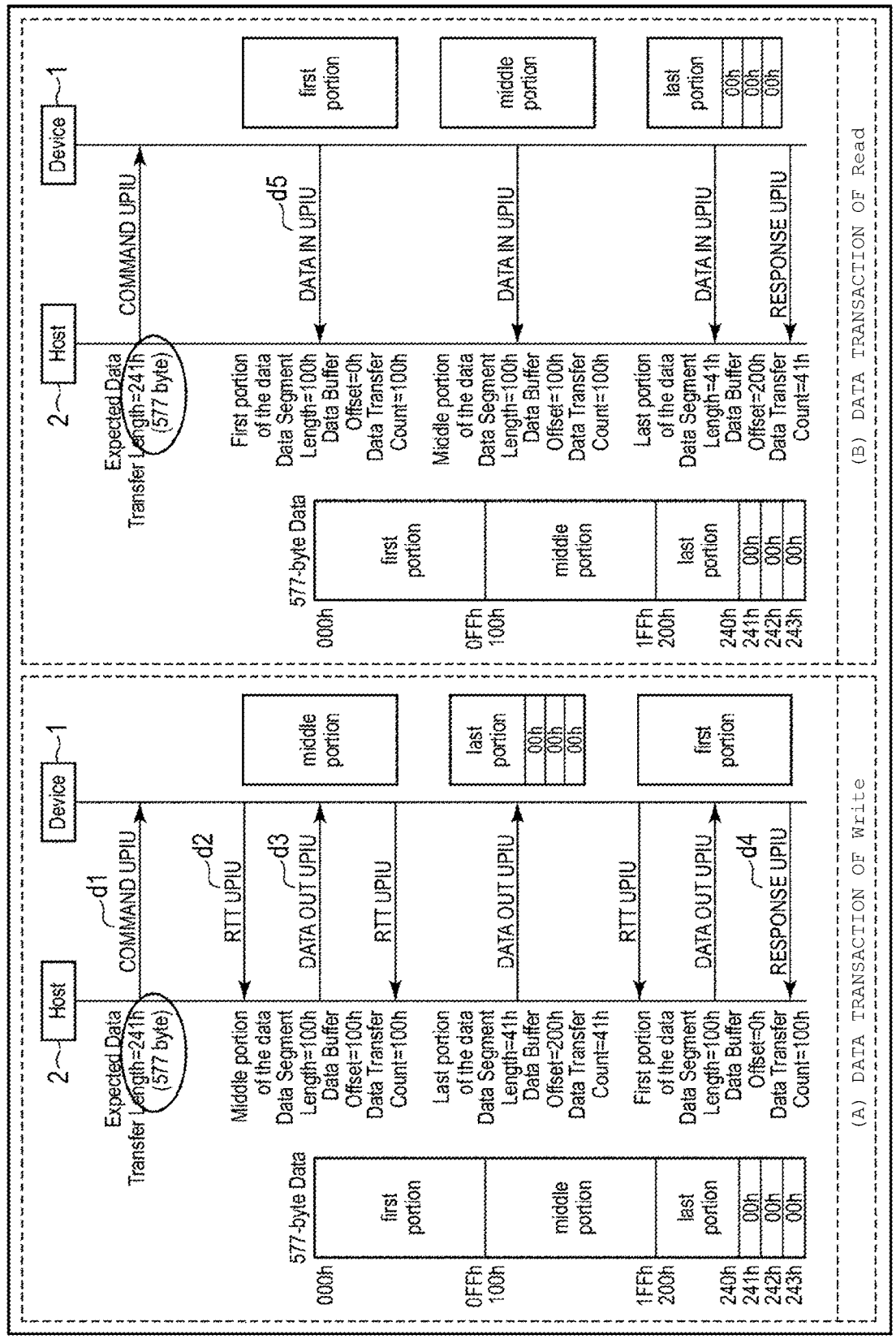
FIG. 5 is a diagram illustrating a flow of data between a host and a storage device at the time of communication with a communication protocol conforming to the UFS specification.

(A) of FIG. 5 illustrates a flow of data between the host 2 and the storage device 1 at the time of issuing a write command by the host 2.

At the time of issuing a write command, first, a COMMAND UPIU d1 is transmitted from the host 2 to the storage device 1. The COMMAND UPIU is a UPIU for transferring a SCSI command. The storage device 1 that receives a write command (SCSI command) contained in the COMMAND UPIU transmits a ready to transfer (RTT) UPIU d2 that is a UPIU for providing a notification of a data size that can be received by itself, to the host 2. Based on the data size indicated by the RTT UPIU, the host 2 stores write data in a DATA OUT UPIU d3, which is a UPIU for transferring the write data, and transmits the write data to the storage device 1. That is, the data size of the write data transmitted from the host 2 to the storage device 1 is determined based on the RTT UPIU transmitted from the storage device 1 to the host 2.

The communication of the RTT UPIU and the DATA OUT UPIU is repeated until the transfer of the write data from the host 2 to the storage device 1 is completed. When finishing receiving the write data, the storage device 1 transmits a RESPONSE UPIU d4, which is a UPIU for providing a notification of the completion of the SCSI command (here, the write command) contained in the COMMAND UPIU, to the host 2.

On the other hand, (B) of FIG. 5 illustrates a flow of data between the host 2 and the storage device 1 at the time of issuing a read command by the host 2.

At the time of issuing a read command also, similarly to at the time of issuing a write command, first, the COMMAND UPIU is transmitted from the host 2 to the storage device 1. The storage device 1 that receives the read command (SCSI command) contained in the COMMAND UPIU sets the read data in a DATA IN UPIU d5, which is a UPIU for transferring the read data, and transmits the read data to the host 2.

The communication of the DATA IN UPIU is repeated until the transfer of the read data from the storage device 1 to the host 2 is completed. When finishing transmitting the read data, the storage device 1 transmits a RESPONSE UPIU, which is a UPIU for providing a notification of the completion of the SCSI command (here, the read command) contained in the COMMAND UPIU, to the host 2.

Figure 6:
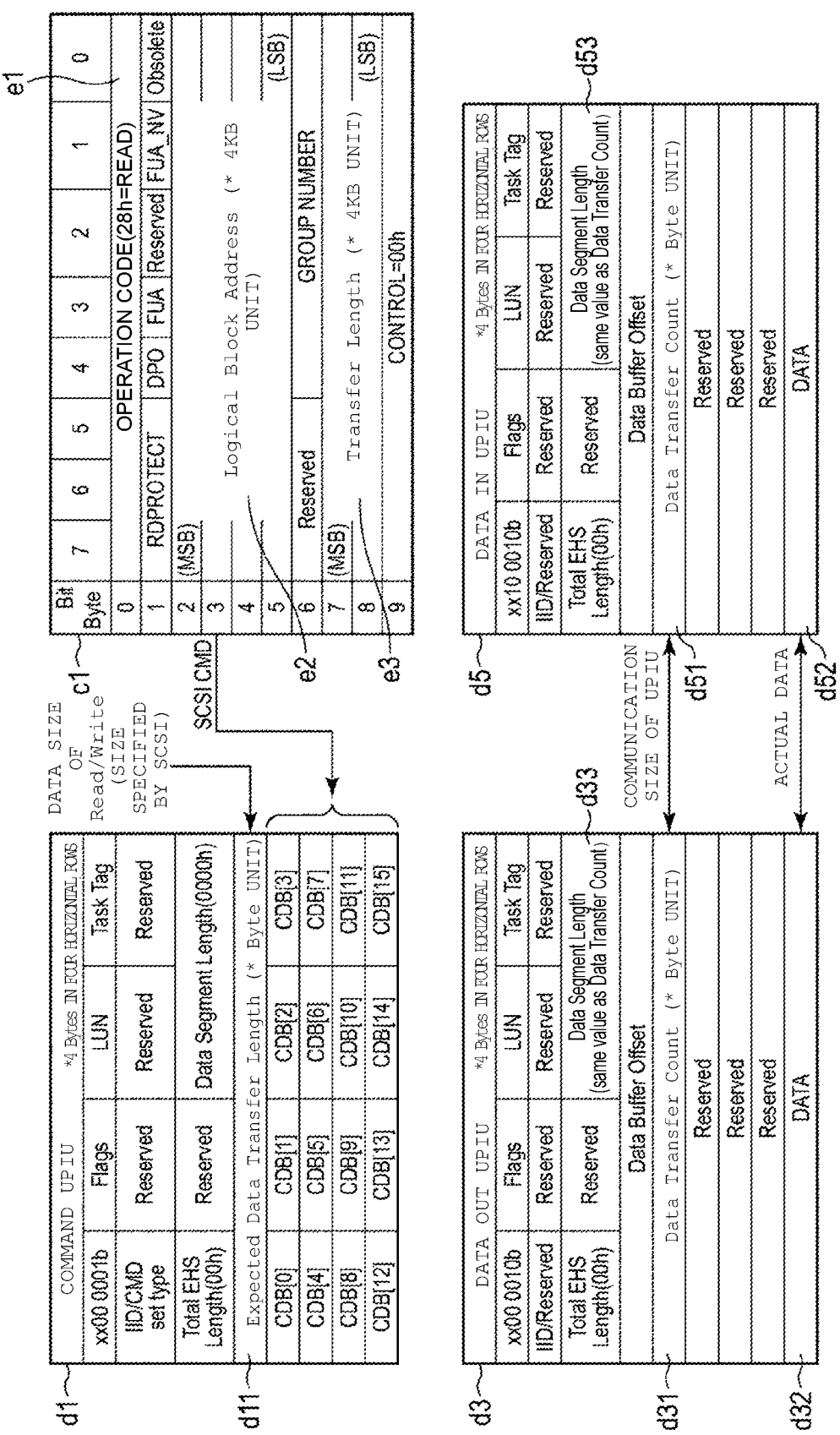
FIG. 6 is a diagram illustrating a relationship between a small computer system interface (SCSI) command and a UFS protocol information unit (UPIU).

FIG. 6 is a diagram illustrating a relationship between a SCSI command and a UPIU.

As described above, the SCSI command c1 issued by the host 2 is contained in the COMMAND UPIU d1 and transmitted to the storage device 1. The SCSI command includes an OPERATION CODE e1. FIG. 6 illustrates an example in which a code (28h) of the read command is contained.

Further, the SCSI command also includes a Logical Block Address e2 and a Transfer Length e3. The Logical Block Address is a logical address indicating a position in which write data is written or a position in which read data exists. The Transfer Length is the size of write data or read data. As mentioned above, SCSI defines that data is handled in units of logical blocks. At present, the LBA size is generally in units of 4K byte. Further, in UFS, the LBA size is defined as a power of 2 of 4K byte. Accordingly, the Logical Block Address and the Transfer Length are specified in units of 4K byte, for example, as illustrated in FIG. 6.

On the other hand, the COMMAND UPIU d1 for transferring the SCSI command also includes an Expected Data Transfer Length d11 indicating the size of write data or read data. In a UPIU, the Expected Data Transfer Length can be specified in units of 1 byte.

Further, the DATA OUT UPIU d3 for transferring write data and the DATA IN UPIU d5 for transferring read data include Data Transfer Counts d31 and d51. The Data Transfer Count indicates the size of write data or read data (d32, d52) transferred in each UPIU. In a UPIU, the Data Transfer Count can also be specified in units of 1 byte. The DATA OUT UPIU d3 and the DATA IN UPIU d5 also include Data Segment Lengths d33 and d53 in which the same values as the Data Transfer Counts d31 and d51 are contained.

Based on the relationship between the SCSI command and the UPIU illustrated in FIG. 6, first, with reference to FIG. 7, the operation of the UFS layer 221 of the host 2 performed with respect to the COMMAND UPIU will be described.

Figure 7:
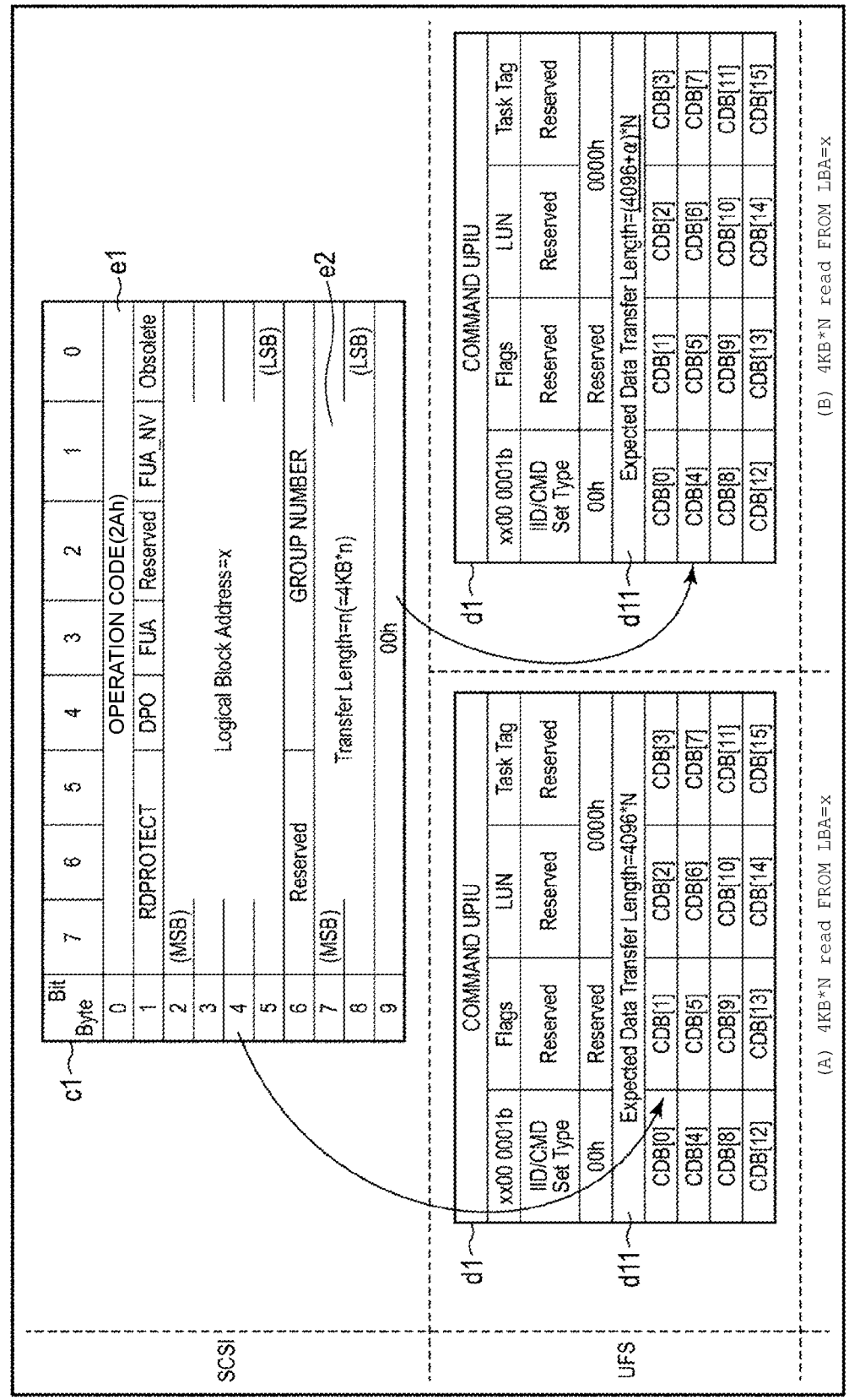
FIG. 7 is a diagram illustrating an operation of a UFS layer of the host related to a COMMAND UPIU of an information processing system of an embodiment.

(A) of FIG. 7 illustrates the COMMAND UPIU d1 in an information processing system in which the EDC 102 is not added to the data 101. When the EDC 102 is not added to the data 101, the value of the Transfer Length e2 of the SCSI command c1 is contained as it is in the Expected Data Transfer Length d11 of the COMMAND UPIU (4096×N).

On the other hand, (B) of FIG. 7 illustrates the COMMAND UPIU d1 communicated in the information processing system 100 of the present embodiment. The UFS layer 221 of the host 2 sets the value obtained by adding the total data size of the EDC 102 to the value of the Transfer Length e2 of the SCSI command c1, in the Expected Data Transfer Length d11 of the COMMAND UPIU ((4096+$\alpha$)×N). As described above, the Transfer Length of the SCSI command is specified in units of 4K byte, so that the SCSI layer specifies the data size of the data 101 in the Transfer Length before adding the created EDC 102.

Next, with reference to FIG. 8, the operation of the UFS layer 111 of the storage device 1 performed with respect to the RTT UPIU will be described.

Figure 8:
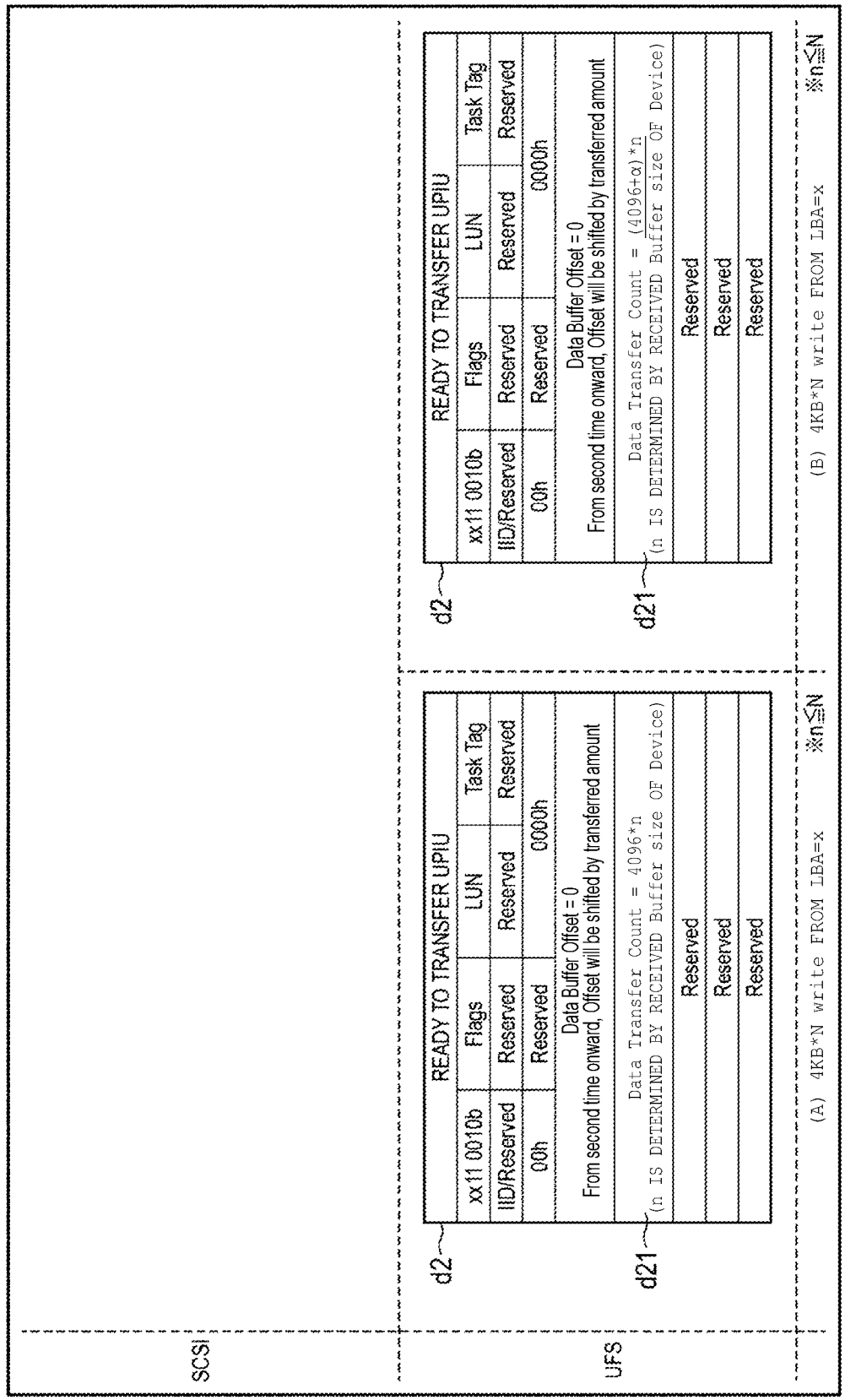
FIG. 8 is a diagram illustrating an operation of a UFS layer of a storage device related to a RTT UPIU of an information processing system of an embodiment.

(A) of FIG. 8 illustrates the RTT UPIU d2 in an information processing system in which the EDC 102 is not added to the data 101.

As described above, the data size of the write data transmitted from the host 2 to the storage device 1 is determined based on the RTT UPIU transmitted from the storage device 1 to the host 2. The RTT UPIU includes a Data Transfer Count d21 indicating the data size. When the EDC 102 is not added to the data 101, the Data Transfer Count of the RTT UPIU is set to a value that is a multiple of 4K byte, which is determined based on the buffer size of the storage device 1.

On the other hand, (B) of FIG. 8 illustrates the RTT UPIU d1 communicated in the information processing system 100 of the present embodiment. The UFS layer 111 of the storage device 1 sets a value in a multiple of (4K byte+a), which is determined based on the buffer size of the storage device 1, in the Data Transfer Count d21 of the RTT UPIU. As a result, the host 2 can transmit the write data having a data size that is a multiple of (4K byte+$\alpha$) to the storage device 1.

Next, with reference to FIG. 9, the operation of the UFS layer 221 of the host 2 performed related to a DATA OUT UPIU will be described.

Figure 9:
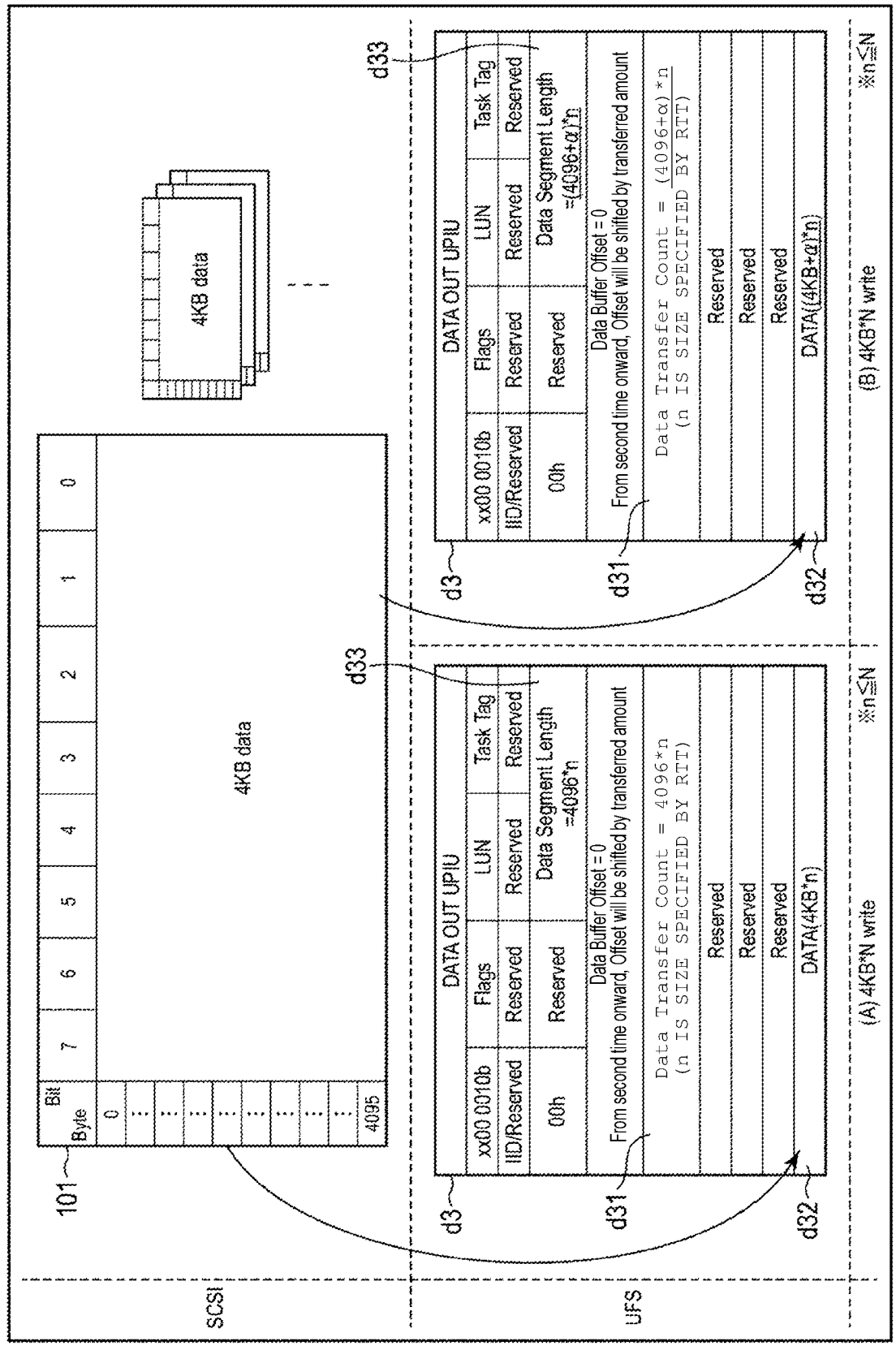
FIG. 9 is a diagram illustrating an operation of a UFS layer of a host related to a DATA OUT UPIU of an information processing system of an embodiment.

(A) of FIG. 9 illustrates the DATA OUT UPIU d3 in an information processing system in which the EDC 102 is not added to the data 101. The data size of the data 101 is a multiple of 4K byte, which is the size of the data area included in the page of the NAND memory 20. Accordingly, when the EDC 102 is not added to the data 101, the size of the DATA d32 of the DATA OUT UPIU that contains only the data 101 is a multiple of 4K byte. Accordingly, a value that is a multiple of 4K byte is set in the Data Transfer Count d31 of the DATA OUT UPIU (4096×n). Further, a value that is a multiple of 4K byte is also set in the Data Segment Length d33 that is set to the same value as the Data Transfer Count.

On the other hand, (B) of FIG. 9 illustrates the DATA OUT UPIU d3 communicated in the information processing system 100 of the present embodiment. The UFS layer 221 of the host 2 sets the data 101 and the EDC 102 passed from the SCSI layer in the DATA d32 of the DATA OUT UPIU. The size of the data 101 is a multiple of 4K byte, and the EDC 102 is generated every 4K byte. Accordingly, the size of the DATA is a multiple of (4K byte+$\alpha$). The UFS layer 221 of the host 2 sets the size of the DATA, which is a multiple of (4K byte+$\alpha$), in the Data Transfer Count d31 of the DATA OUT UPIU ((4096+$\alpha$)×n). Accordingly, the UFS layer 221 of the host 2 also sets the size of the DATA, which is a multiple of (4K byte+$\alpha$), in the Data Segment Length d33.

Next, with reference to FIG. 10, the operation of the UFS layer 221 of the host 2 performed related to the DATA IN UPIU will be described.

Figure 10:
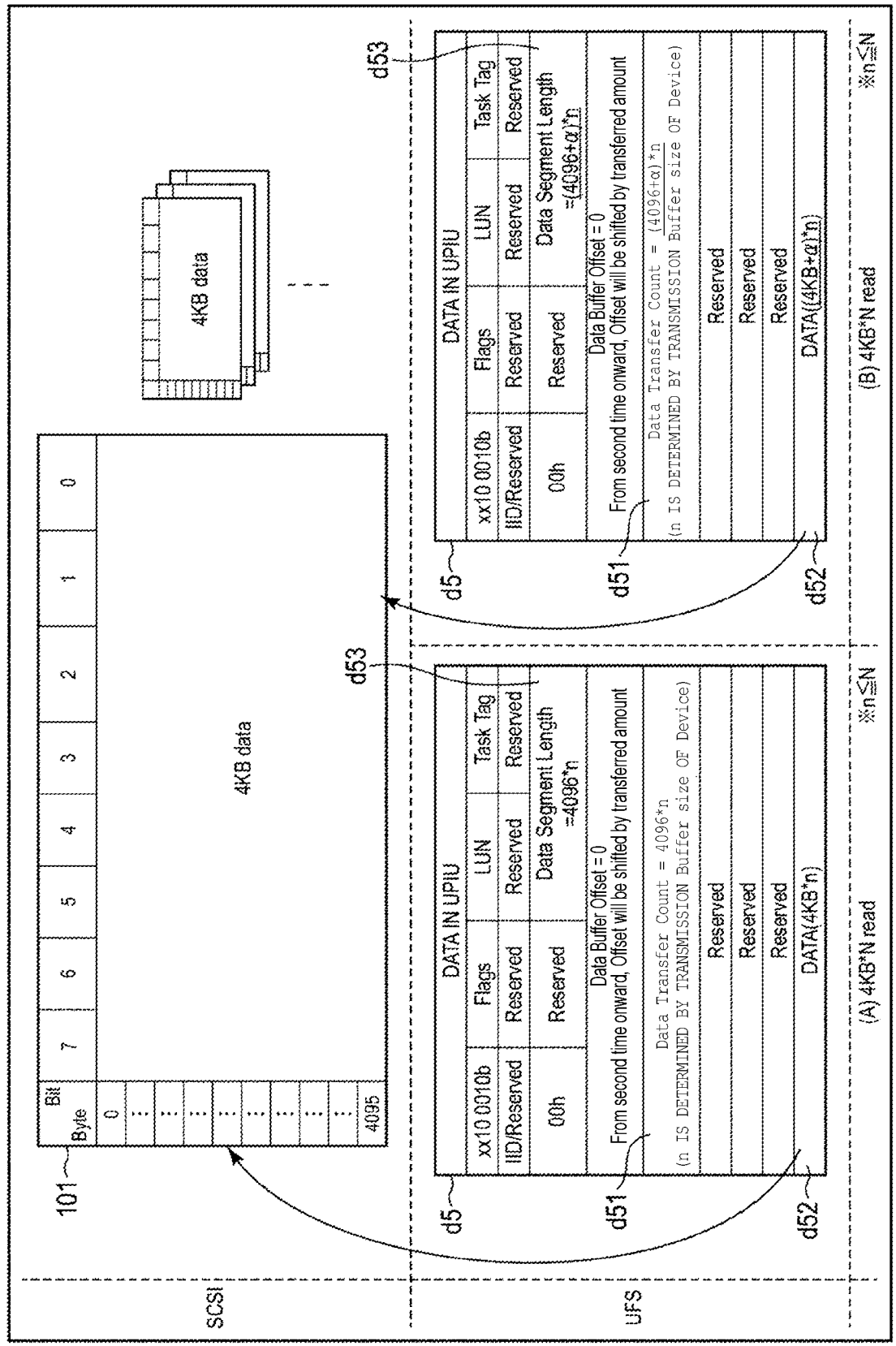
FIG. 10 is a diagram illustrating an operation of a UFS layer of a host related to a DATA IN UPIU of an information processing system of an embodiment.

(A) of FIG. 10 illustrates the DATA IN UPIU d5 in an information processing system in which the EDC 102 is not added to the data 101. When the EDC 102 is not added to the data 101, the size of the DATA IN UPIU DATA d52 that contains only the data 101 is a multiple of 4K byte. Accordingly, the Data Transfer Count d51 of the DATA IN UPIU is set to a value that is a multiple of 4K byte (4096×n). Based on the value of the Data Transfer Count, the data 101 having a data size that is a multiple of 4K byte is extracted from the DATA IN UPIU and passed to the SCSI layer that is the supply source of the SCSI command (read command).

On the other hand, (B) of FIG. 10 illustrates the DATA IN UPIU d5 communicated in the information processing system 100 of the present embodiment. In the information processing system 100 of the present embodiment in which the EDC 102 is added to the data 101, the data 101+ the EDC 102 is set in the DATA d52 of the DATA IN UPIU. Accordingly, the Data Transfer Count d51 of the DATA IN UPIU is set to a value ((4096+$\alpha$)×n) that is a multiple of (4K byte+$\alpha$). The UFS layer 221 of the host 2 extracts the data 101+ the EDC 102 having a data size that is a multiple of (4K byte+$\alpha$) from the DATA IN UPIU based on the value of the Data Transfer Count. The UFS layer 221 of the host 2 inspects the integrity of the data 101 using the EDC 102. When the integrity of the data 101 is verified, the UFS layer 221 of the host 2 passes the data 101 to the SCSI layer which is the supply source of the SCSI command (read command). According to the inspection, when an error occurs in the data 101 inside the controller 10 of the storage device 1, the error can be detected.

Next, with reference to FIG. 11, the operation of the UFS layer 111 of the storage device 1 performed related to the COMMAND UPIU will be described. It is assumed that the COMMAND UPIU contains a SCSI command (write command) that requests the write of the data 101 (OPERATION CODE=2Ah).

Figure 11:
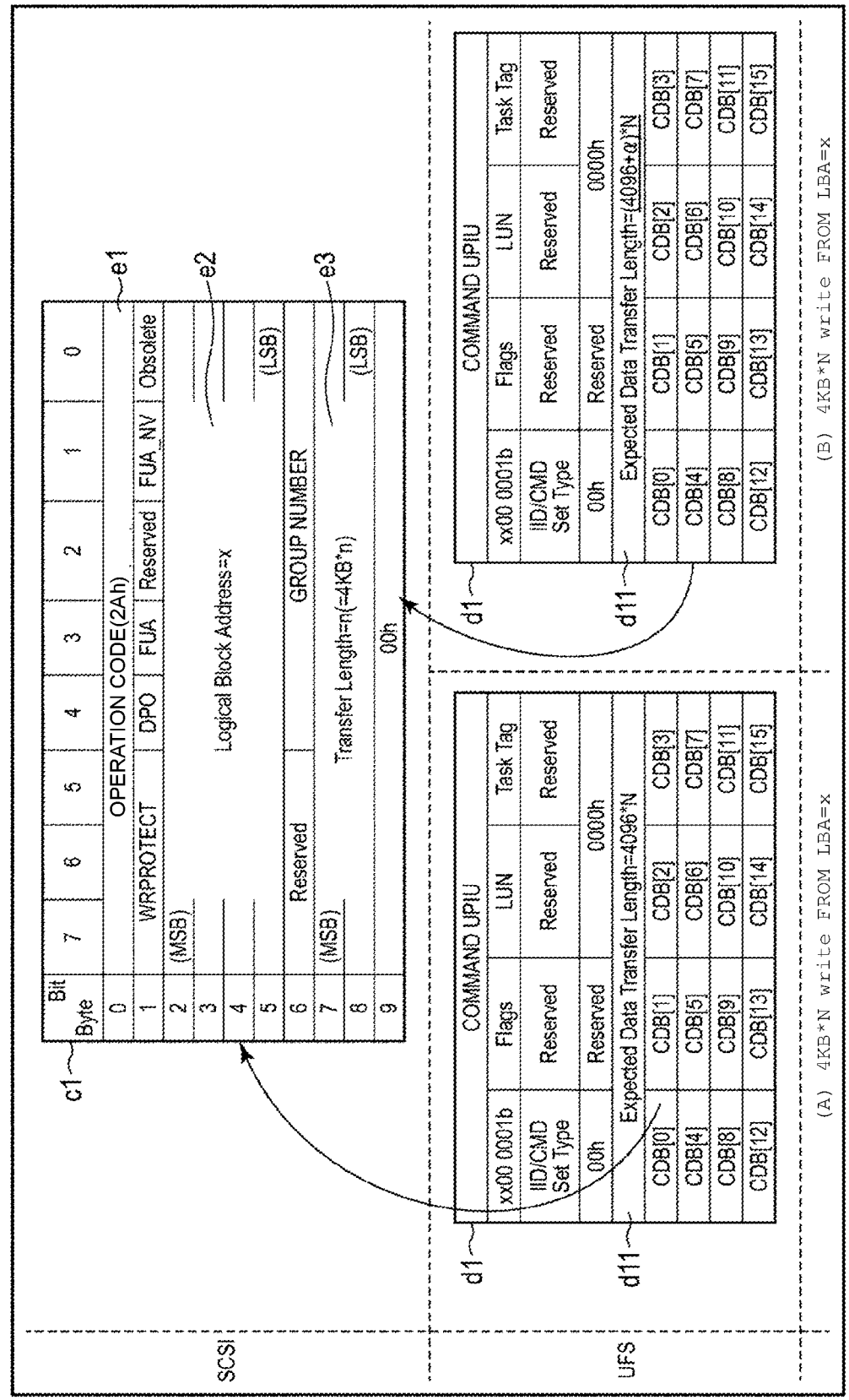
FIG. 11 is a diagram illustrating an operation of a UFS layer of a storage device related to a COMMAND UPIU of an information processing system of an embodiment.

(A) of FIG. 11 illustrates the COMMAND UPIU d1 in an information processing system in which the EDC 102 is not added to the data 101. The OPERATION CODE e1 of the SCSI command c1 is a code (2Ah) of the write command. When the EDC 102 is not added to the data 101, the Transfer Length e3 of the SCSI command c1 and the Expected Data Transfer Length d11 of the COMMAND UPIU d1 that contains the SCSI command match.

On the other hand, (B) of FIG. 11 illustrates the COMMAND UPIU d1 communicated in the information processing system 100 of the present embodiment. As described with reference to FIG. 7, in the information processing system 100 of the present embodiment in which the EDC 102 is added to the data 101, the UFS layer 221 of the host 2 sets the value obtained by adding the total data size of the EDC 102 to the value of the Transfer Length e3 of the SCSI command c1, in the Expected Data Transfer Length d11 of the COMMAND UPIU. Accordingly, the Transfer Length of the SCSI command and the Expected Data Transfer Length of the COMMAND UPIU do not match. Due to this discrepancy, the UFS layer 111 of the storage device 1 recognizes that the processing target is the data 101 to which the EDC 102 is added, and prepares to process the data 101+ the EDC 102. Specifically, the UFS layer 111 prepares to write, in addition to the data 101, the EDC 102 as well. In other words, the information processing system 100 of the present embodiment can operate in a mode in which the EDC 102 is not added to the data 101 when the Transfer Length of the SCSI command and the Expected Data Transfer Length of the COMMAND UPIU match.

Next, with reference to FIG. 12, the operation of the UFS layer 111 of the storage device 1 performed related to the DATA OUT UPIU will be described.

Figure 12:
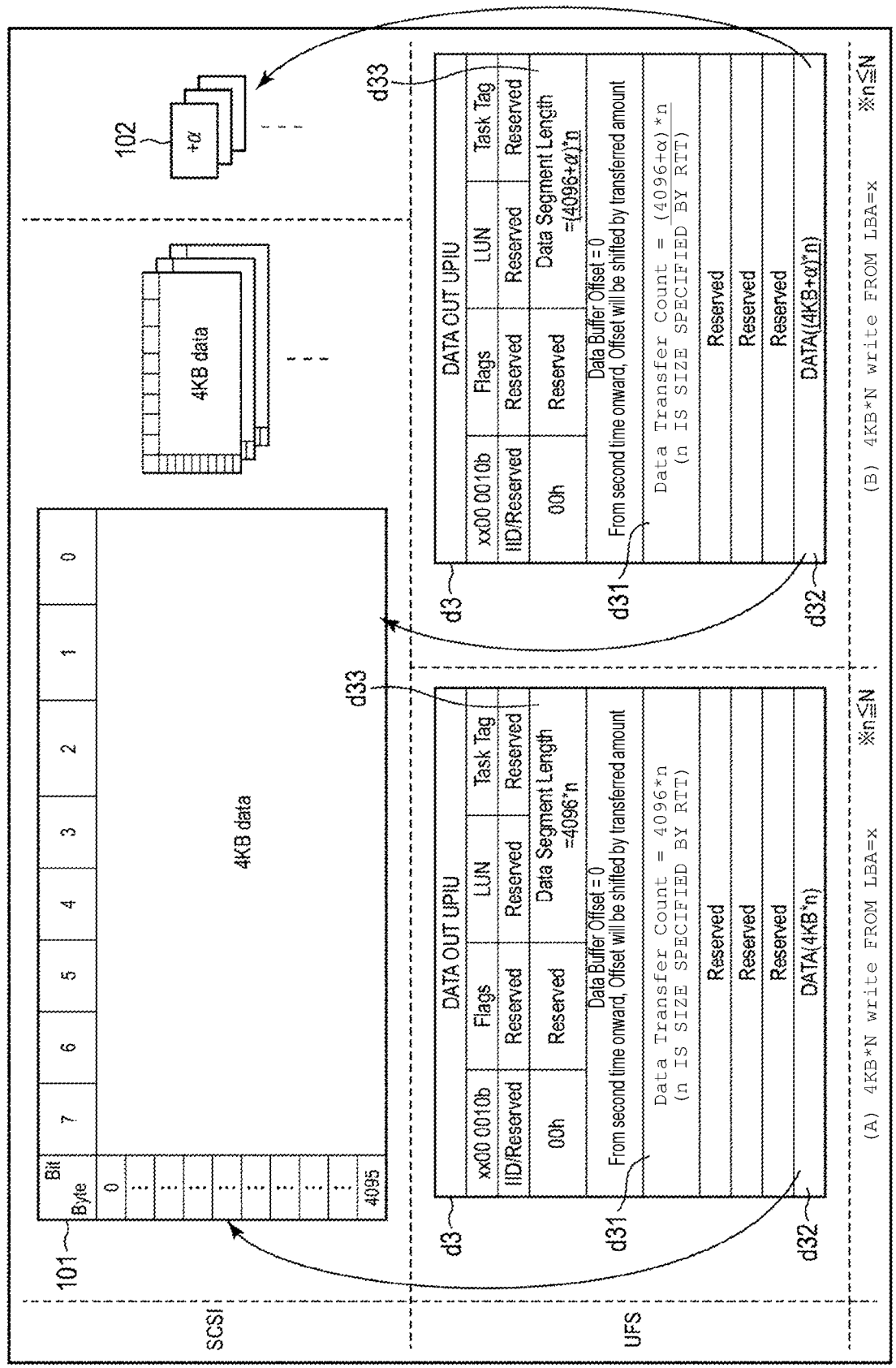
FIG. 12 is a diagram illustrating an operation of a UFS layer of a storage device related to a DATA OUT UPIU of an information processing system of an embodiment.

(A) of FIG. 12 illustrates the DATA OUT UPIU d3 in an information processing system in which the EDC 102 is not added to the data 101. When the EDC 102 is not added to the data 101, the data 101 is contained in the DATA d32 of the DATA OUT UPIU. Further, the data size of the data 101, which is a multiple of 4K byte, is set in the Data Transfer Count d31 of the DATA OUT UPIU. The data 101 is extracted from the DATA OUT UPIU based on the value of the Data Transfer Count. The Data Segment Length d33 is set to the same value as the Data Transfer Count.

On the other hand, (B) of FIG. 12 illustrates the DATA OUT UPIU d3 communicated in the information processing system 100 of the present embodiment. The UFS layer 111 of the storage device 1 extracts the data 101+ the EDC 102 having a data size that is a multiple of (4K byte+α) indicated by the Data Transfer Count d31, from the DATA OUT UPIU. The UFS layer 111 of the storage device 1 separates the data 101+ the EDC 102 into the data 101 and the EDC 102.

Next, with reference to FIG. 13, a first method of storing the data 101 and the EDC 102 separated by the UFS layer 111 in the NAND memory 20, which can be performed by the W/R processing unit 121 of the logic circuit 12, will be described.

Figure 13:
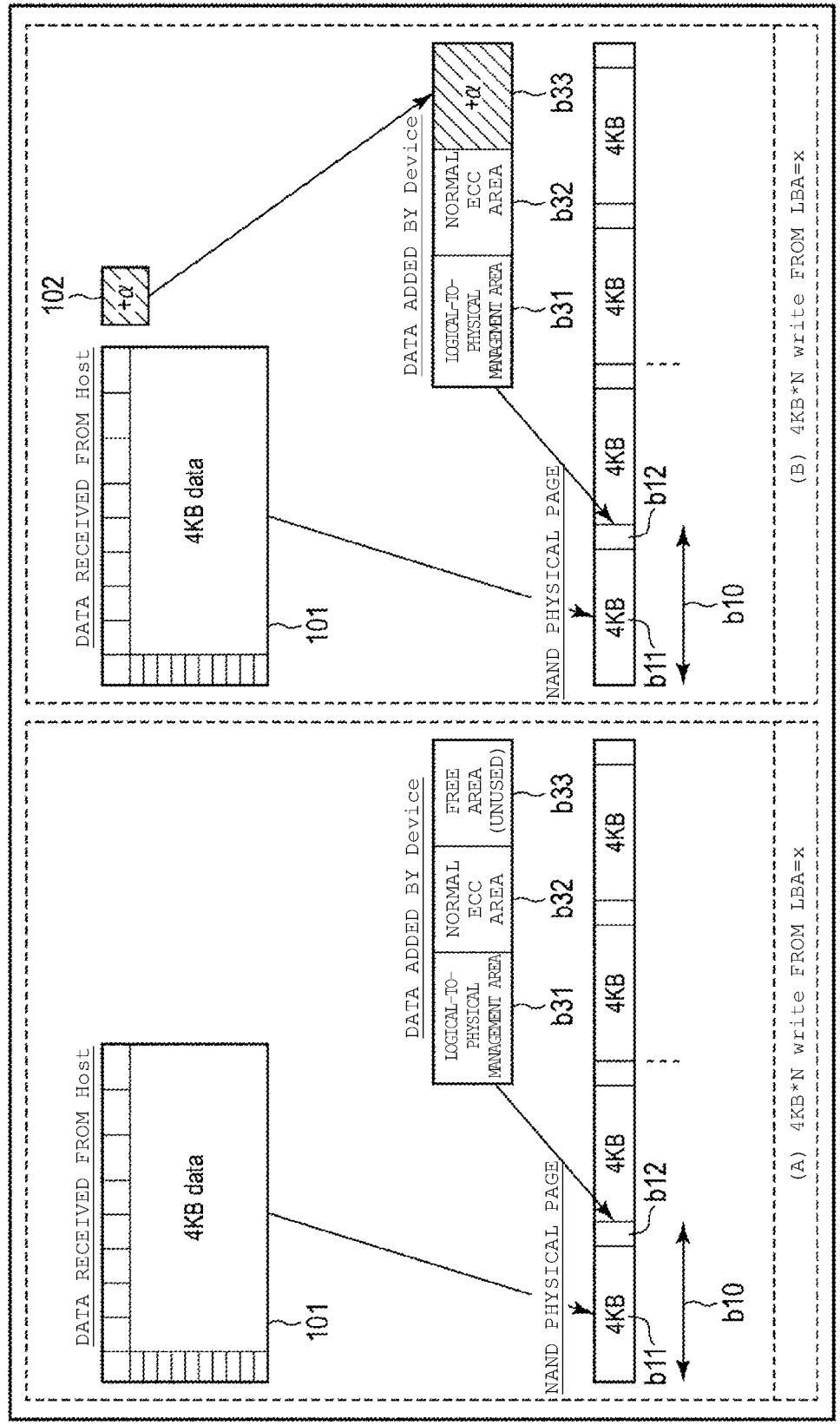
FIG. 13 is a diagram illustrating a first storing method for data and an EDC in a NAND memory, which can be executed in an information processing system of an embodiment.

(A) of FIG. 13 illustrates a storage example of the data 101 in the NAND memory 20 in an information processing system in which the EDC 102 is not added to the data 101.

As described above, the area of the NAND memory 20 is managed in units of pages b10. Each page includes a data area b11 and a redundant area b12. The data 101 is stored in the data area of the page.

The redundant area includes a logical-to-physical management area b31 and an ECC area b32. A logical address assigned to each page is stored in the logical-to-physical management area. The ECC 104 generated by the ECC circuit 14 is stored in the ECC area. The sum of the size of the logical-to-physical management area and the size of the ECC area is smaller than the size of the redundant area. That is, the redundant area includes a free area b33. When the EDC 102 is not added to the data 101, all the free areas will be unused.

On the other hand, (B) of FIG. 13 illustrates a first storage example of the data 101 and the EDC 102 in the NAND memory 20 in the information processing system 100 of the present embodiment.

In addition to storing the data 101 in the data area b11, the W/R processing unit 121 stores the EDC 102 for the data 101 in the unused free area b33 of the redundant area b12 on the same page. The ECC 104 stored in the ECC area b32 corresponds to the data 101+ the EDC 102.

Next, with reference to FIG. 14, a second method of storing the data 101 and the EDC 102 separated by the UFS layer 111 in the NAND memory 20, which can be performed by the W/R processing unit 121 of the logic circuit 12, will be described.

Figure 14:
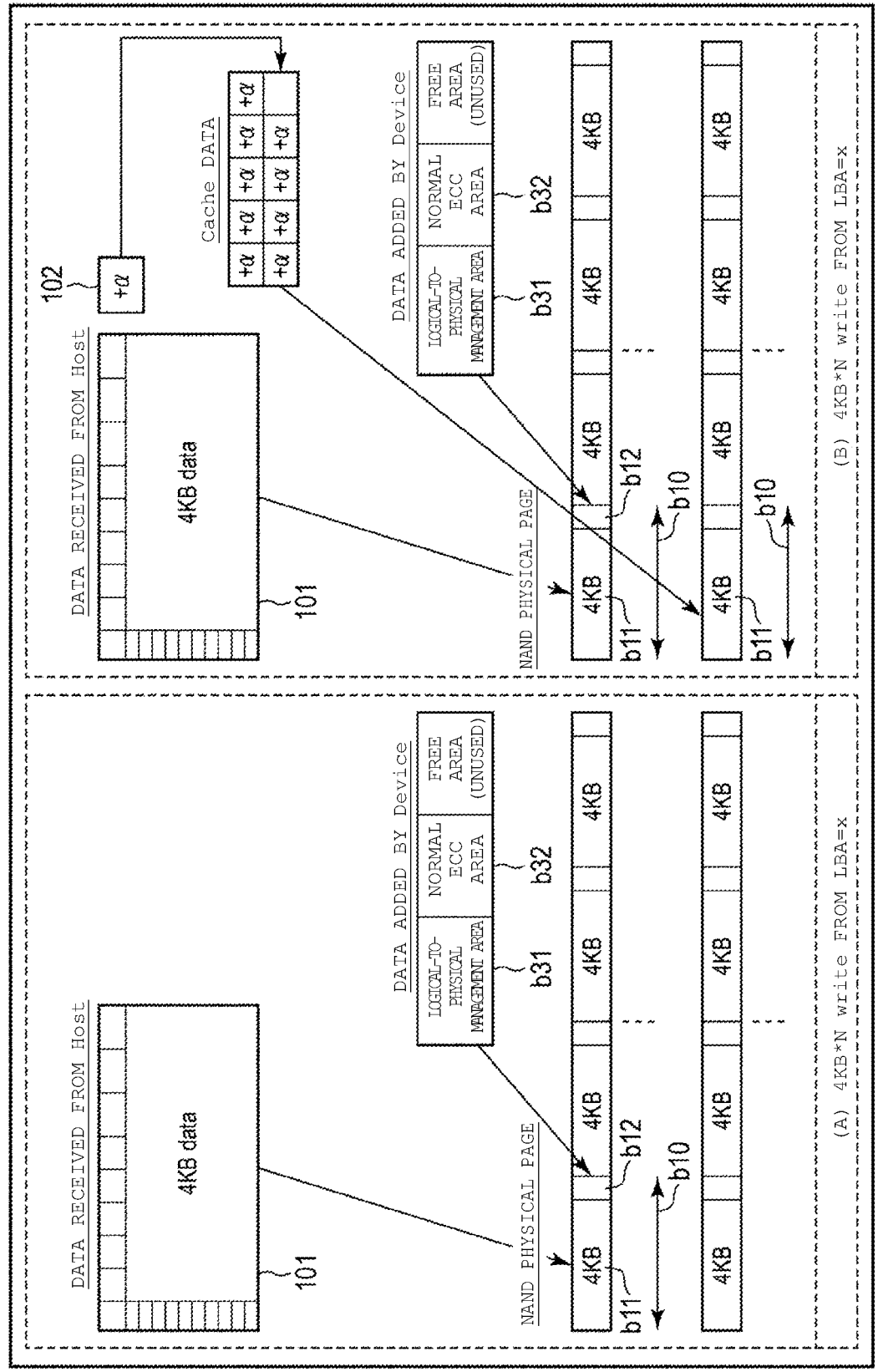
FIG. 14 is a diagram illustrating a second storing method for data and the EDC in a NAND memory that can be executed in an information processing system of an embodiment.

(A) of FIG. 14 illustrates a storage example of the data 101 in the NAND memory 20 in an information processing system in which the EDC 102 is not added to the data 101, as in the case of (A) of FIG. 13. Due to overlapping the description of (A) of FIG. 13, the description of (A) of FIG. 14 will be omitted.

(B) of FIG. 14 illustrates a second storage example of the data 101 and the EDC 102 in the NAND memory 20 in the information processing system 100 of the present embodiment.

In addition to storing the data 101 in the data area b11, the W/R processing unit 121 temporarily stores the EDC 102 for the data 101 in the RAM 13 of the controller 10. When the EDC 102 in the RAM 13 is accumulated for a predetermined number of amounts determined based on the data size of the EDC 102 and the data size of the data area, the W/R processing unit 121 collectively stores the EDCs 102 in the data area b11 of a page different from the page in which the data 101 is stored. The correspondence relation between the data 101 and the EDC 102 is managed, for example, by arranging the EDC 102 in the data area according to a predetermined rule (order).

Figure 15:
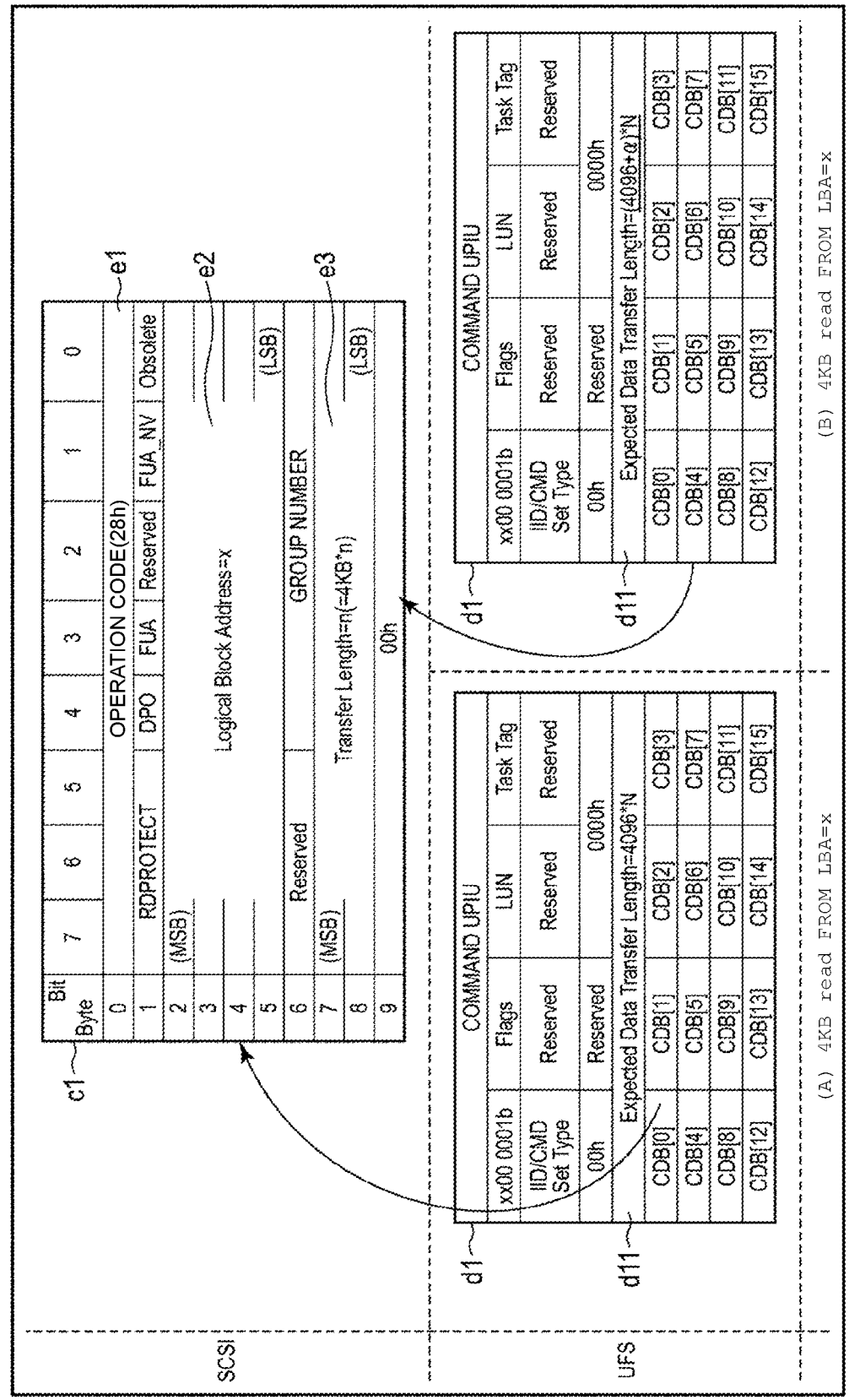
FIG. 15 is a diagram for further explaining an operation of a UFS layer of a storage device related to the COMMAND UPIU of an information processing system of an embodiment.

FIG. 15 illustrates the COMMAND UPIU that contains the SCSI command c1 in which the OPERATION CODE e1 is a code (28*h*) of the read command that requests the read of the data 101.

Similarly to the SCSI command in which the OPERATION CODE is the code (2Ah) of the write command illustrated in FIG. 11, when the EDC 102 is not added to the data 101, the Transfer Length e3 of the SCSI command and the Expected Data Transfer Length d11 of the COMMAND UPIU d1 that contains the SCSI command match ((A) of FIG. 15). Further, when the EDC 102 is added to the data 101, the Transfer Length of the SCSI command and the Expected Data Transfer Length of the COMMAND UPIU do not match ((B) of FIG. 15).

Due to this discrepancy, the UFS layer 111 of the storage device 1 recognizes that the processing target is the data 101 to which the EDC 102 is added, and prepares to process the data 101+ the EDC 102. Specifically, the UFS layer 111 prepares to read, in addition to the data 101, the EDC 102 as well.

Next, with reference to FIG. 16, a first method of reading the data 101 and the EDC 102 from the NAND memory 20, which can be performed by the W/R processing unit 121 of the logic circuit 12, will be described.

Figure 16:
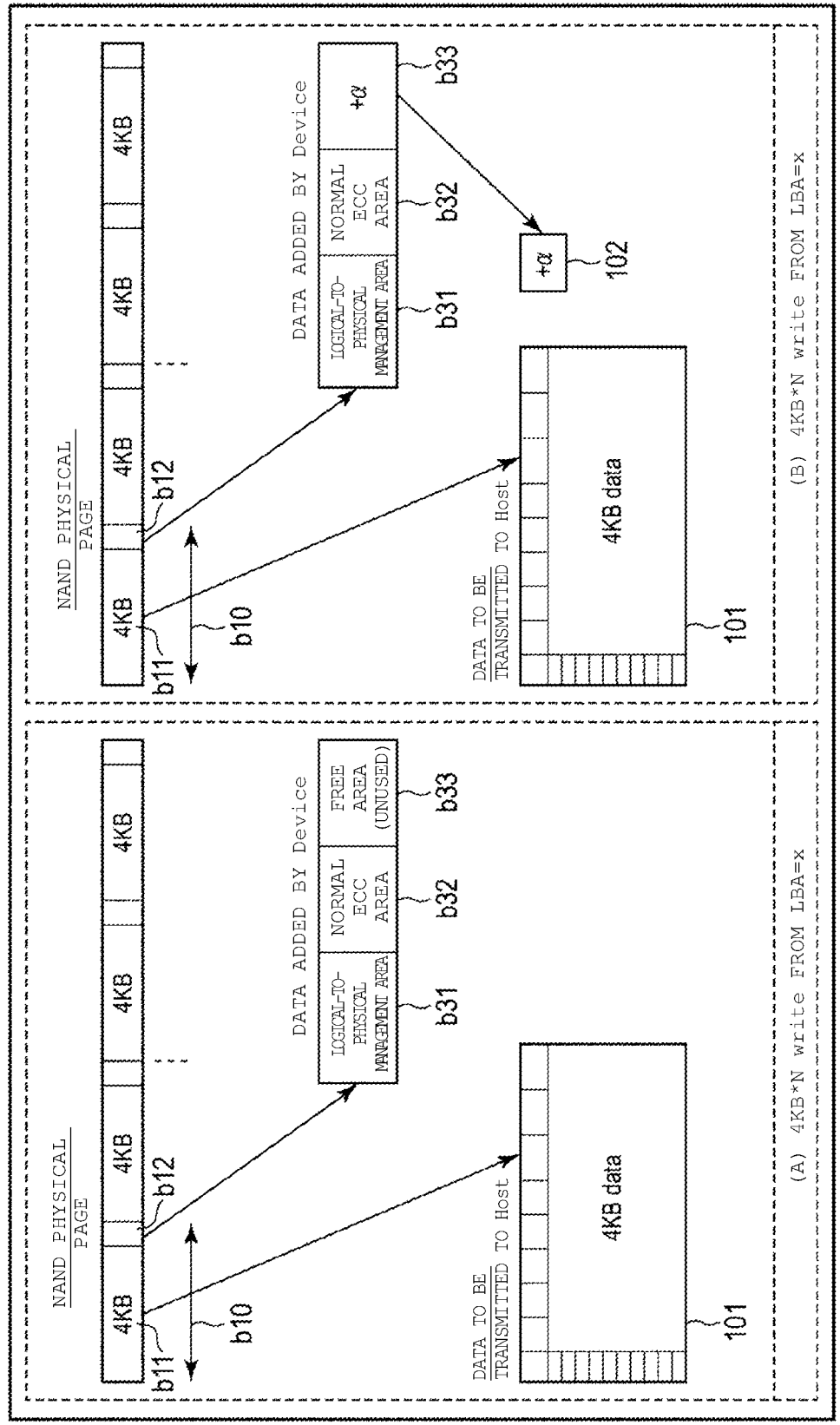
FIG. 16 is a diagram illustrating a first read method of data and the EDC from the NAND memory that can be executed in an information processing system of an embodiment.

(A) of FIG. 16 illustrates a read example of the data 101 from the NAND memory 20 in an information processing system in which the EDC 102 is not added to the data 101.

When the EDC 102 is not added to the data 101, the data 101 is read from the data area b11 of the page b10 and inspected using the ECC 104 stored in the ECC area b32.

On the other hand, (B) of FIG. 16 illustrates a first read example of the data 101 and the EDC 102 from the NAND memory 20 in the information processing system 100 of the present embodiment.

In addition to reading the data 101 from the data area b11, the W/R processing unit 121 reads the EDC 102 for the data 101 from the area b33, which is not used in (A) of FIG. 16, of the redundant area b12 on the same page. The W/R processing unit 121 instructs the ECC circuit 14 to inspect the data 101+ the EDC 102 using the ECC 104 stored in the ECC area b32.

Next, with reference to FIG. 17, a second method of reading the data 101 and the EDC 102 from the NAND memory 20, which can be performed by the W/R processing unit 121 of the logic circuit 12, will be described.

Figure 17:
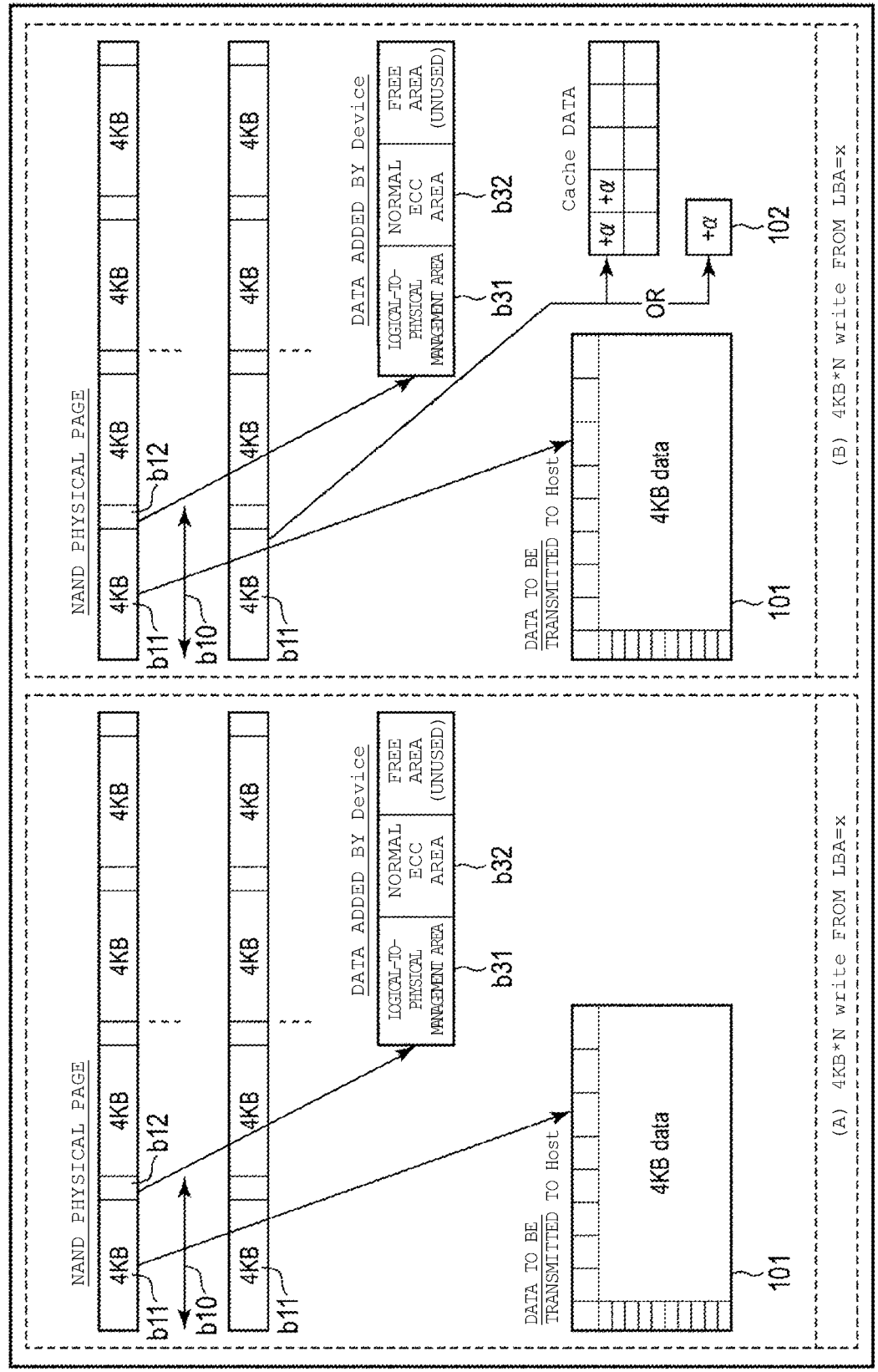
FIG. 17 is a diagram illustrating a second read method of data and the EDC from the NAND memory that can be executed in an information processing system of an embodiment.

(A) of FIG. 17 illustrates a read example of the data 101 from the NAND memory 20 in an information processing system in which the EDC 102 is not added to the data 101, similarly to (A) of FIG. 16. Due to overlapping the description of (A) of FIG. 16, the description of (A) of FIG. 17 will be omitted.

(B) of FIG. 17 illustrates a second read example of the data 101 and the EDC 102 from the NAND memory 20 in the information processing system 100 of the present embodiment.

The W/R processing unit 121 reads the data 101 from the data area b11. Further, the W/R processing unit 121 reads a predetermined number of the EDCs 102 including the EDC 102 for the data 101 from the data areas of different pages, and, for example, temporarily stores the EDC 102 in the RAM 13 in the controller 10. The W/R processing unit 121 instructs the ECC circuit 14 to inspect each of the data 101 and the EDC 102 that are read, using the ECC 104 stored in the ECC area b32.

Next, the operation of the UFS layer 111 of the storage device 1 performed related to the DATA IN UPIU will be described.

Figure 18:
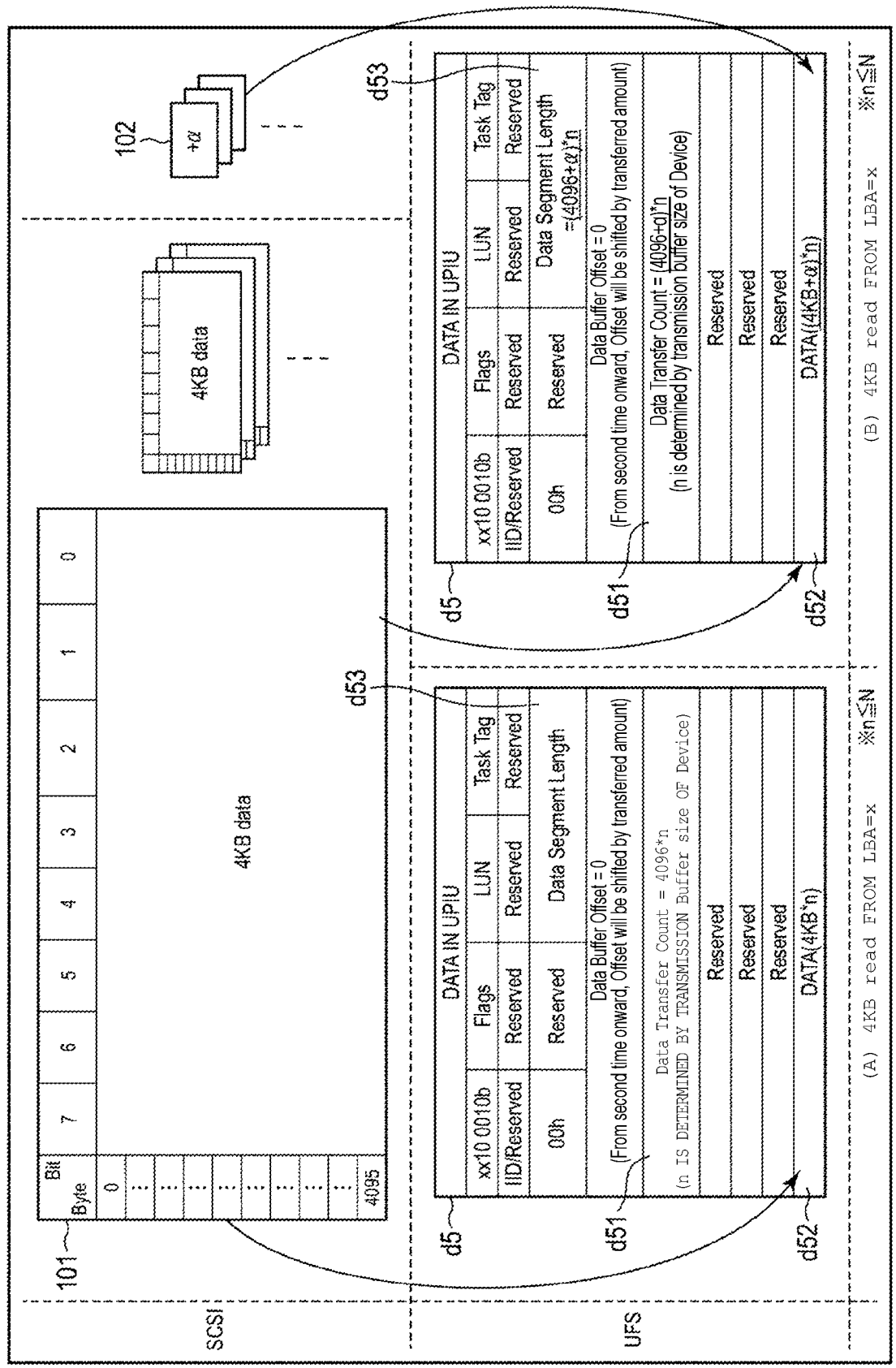
FIG. 18 is a diagram illustrating an operation of a UFS layer of the storage device related to the DATA IN UPIU of an information processing system of an embodiment.

(A) of FIG. 18 illustrates the DATA IN UPIU d5 in an information processing system in which the EDC 102 is not added to the data 101. When the EDC 102 is not added to the data 101, the data 101 is contained in the DATA d52 of the DATA IN UPIU. Accordingly, the Data Transfer Count d51 of the DATA IN UPIU is a value that is a multiple of 4K byte. Accordingly, the Data Segment Length d53 of the DATA IN UPIU is also a value that is a multiple of 4K byte (the same value as the Data Transfer Count).

On the other hand, (B) of FIG. 18 illustrates the DATA IN UPIU d5 communicated in the information processing system 100 of the present embodiment. The UFS layer 111 of the storage device 1 combines the data 101 and the EDC 102 and sets the combination in the DATA d52 of the DATA IN UPIU. The UFS layer 111 of the storage device 1 sets a value that is a multiple of (4K byte+α), which is the data size of the data 101+ the EDC 102, in the Data Transfer Count d51 of the DATA IN UPIU. Further, the UFS layer 111 of the storage device 1 sets the same value as the Data Transfer Count in the Data Segment Length d53 of the DATA IN UPIU.

Figure 19:
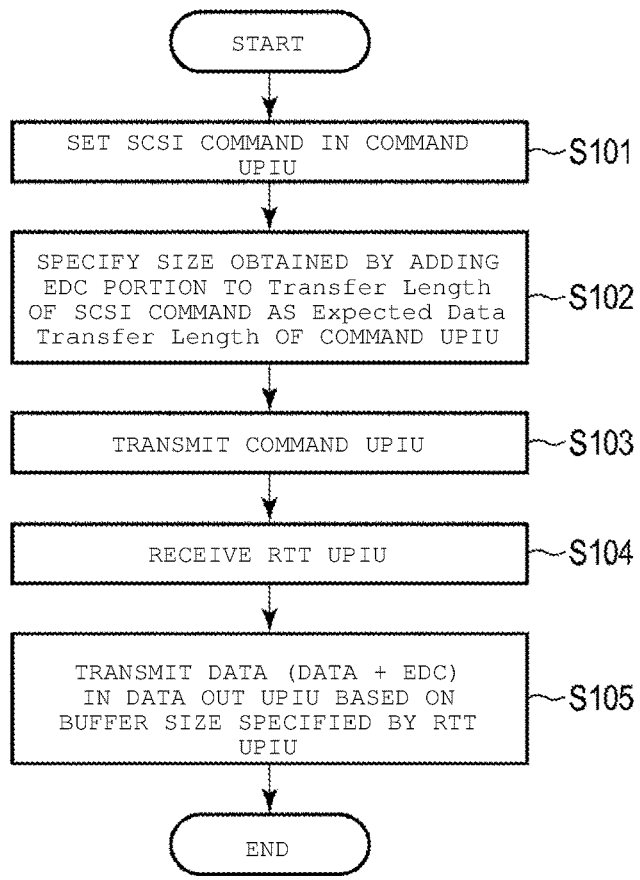
FIG. 19 is a flowchart illustrating an operating procedure of the host at the time of writing data.

FIG. 19 is a flowchart illustrating an operating procedure of the host 2 at the time of writing data.

The UFS layer 221 of the host 2 sets the SCSI command received from the SCSI layer in the COMMAND UPIU (S101). The UFS layer 221 specifies the size ((4096+α)×N) obtained by adding the EDC portion to the Transfer Length of the SCSI command as the Expected Data Transfer Length of the COMMAND UPIU (S102).

The UFS layer 221 transmits the COMMAND UPIU to the UFS layer 111 of the storage device 1 (S103), and receives the RTT UPIU returned with respect to the COMMAND UPIU (S104). The UFS layer 221 sets the data (data+ EDC: (4K bytes+α)×n) received from the SCSI layer in the DATA OUT UPIU based on the size specified by the RTT UPIU, and transmits the data to the UFS layer 111 of the storage device 1 (S105).

Figure 20:
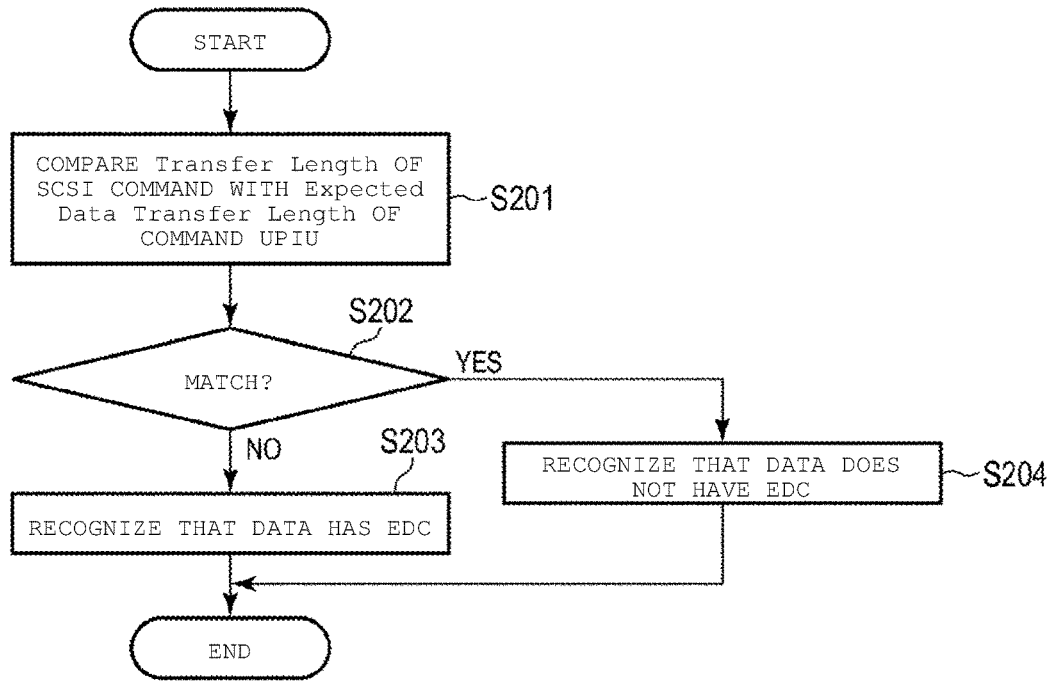
FIG. 20 is a first flowchart illustrating an operating procedure of the storage device at the time of writing data.

FIG. 20 is a first flowchart illustrating an operating procedure of the storage device 1 at the time of writing data.

The UFS layer 111 of the storage device 1 compares the Transfer Length of the SCSI command contained in the COMMAND UPIU received from the UFS layer 221 of the host 2 with the Expected Data Transfer Length of the COMMAND UPIU (S201).

When the Transfer Length of the SCSI command and the Expected Data Transfer Length of the COMMAND UPIU do not match (S202: NO), the UFS layer 111 recognizes that the data to be written has the EDC (S203). On the other hand, when they match (S202: YES), the UFS layer 111 recognizes that the data to be written has no EDC (S204).

Figure 21:
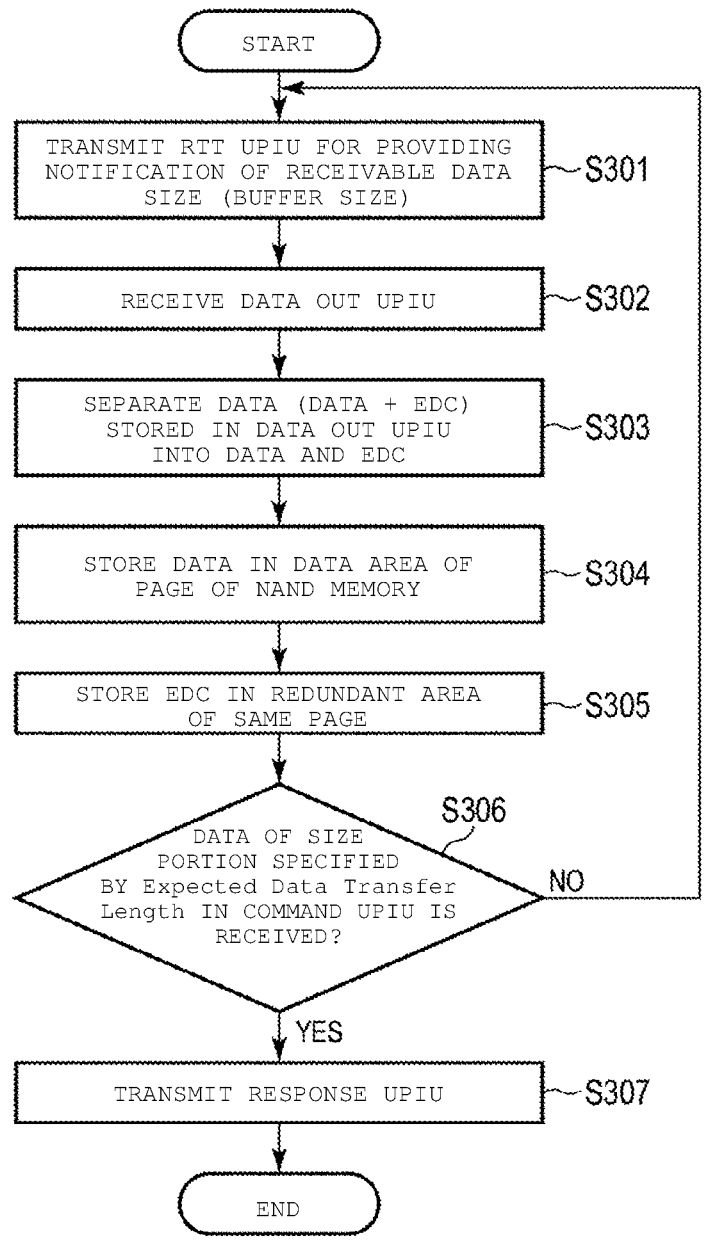
FIG. 21 is a second flowchart illustrating an operating procedure of the storage device at the time of writing data.

FIG. 21 is a second flowchart illustrating an operating procedure of the storage device 1 at the time of writing data. In FIG. 21, at the step S203 of FIG. 20, the operating procedure of the storage device 1 is illustrated when it is recognized that the data to be written includes the EDC.

The UFS layer 111 of the storage device 1 transmits the RTT UPIU for providing a notification of the receivable data size (buffer size) to the UFS layer 221 of the host 2 (S301), and receives the DATA OUT UPIU that is created and transmitted based on the RTT UPIU (S302). The UFS layer 111 separates the data (data+ EDC) contained in the DATA OUT UPIU into the data and the EDC (S303).

The W/R processing unit 121 of the storage device 1 stores the data in the data area of the page of the NAND memory 20 (S304). Further, the W/R processing unit 121 stores the EDC in the redundant area of the same page (S305).

The UFS layer 111 of the storage device 1 determines whether the data of a size portion specified by the Expected Data Transfer Length of the COMMAND UPIU is received (S306). When the specified size portion is not reached (S306: NO), the UFS layer 111 executes the transmission of the RTT UPIU in the step S301. When the specified size portion is reached (S306: YES), the UFS layer 111 transmits the RESPONSE UPIU to the UFS layer 221 of the host 2 (S307). As a result, the data write operation ends.

Figure 22:
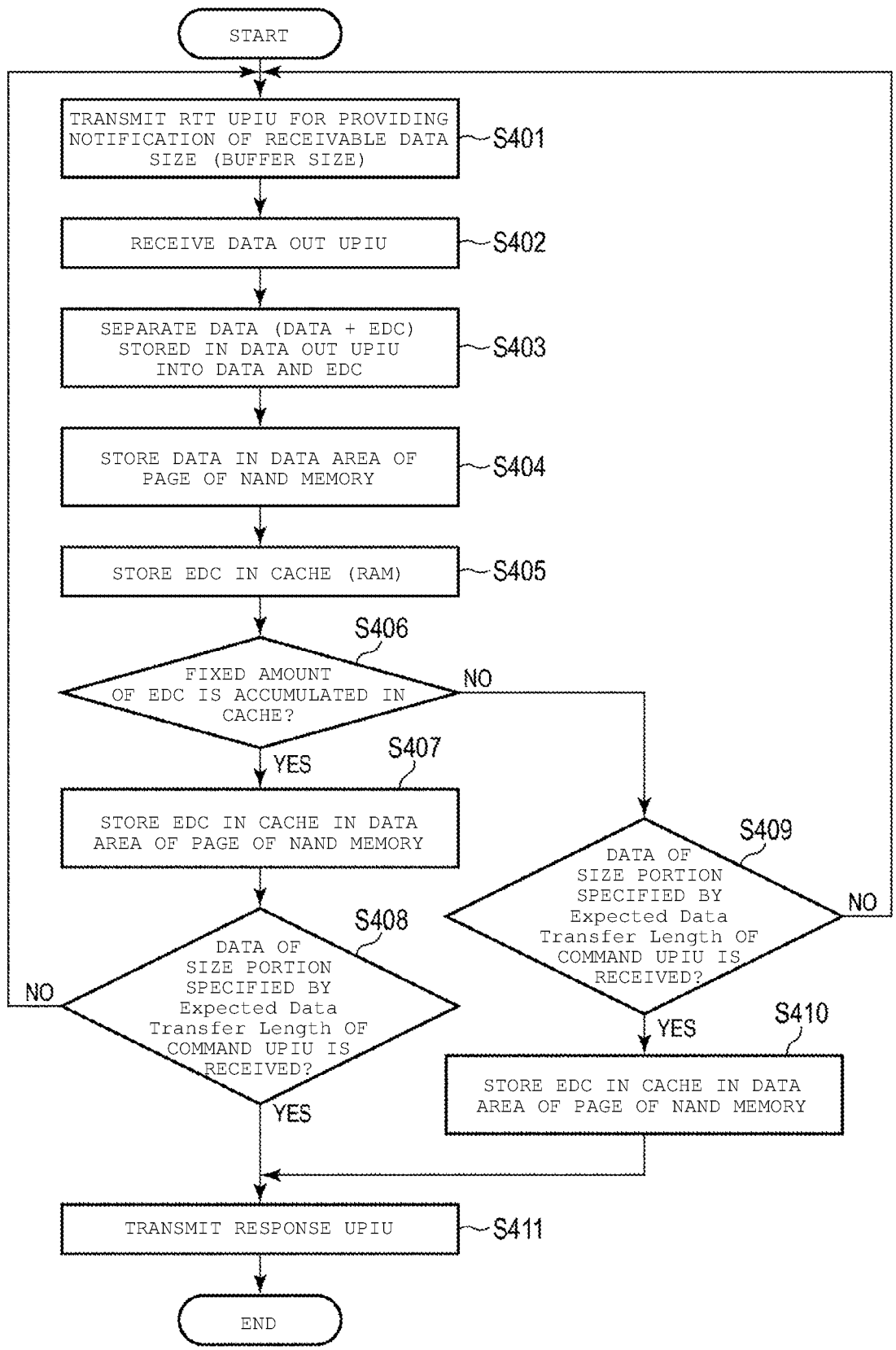
FIG. 22 is a third flowchart illustrating an operating procedure of the storage device at the time of writing data.

FIG. 22 is a third flowchart illustrating an operating procedure of the storage device 1 at the time of writing data. In FIG. 22, at the step S203 of FIG. 20, another operating procedure of the storage device 1 is illustrated when it is recognized that the data to be written includes the EDC.

The UFS layer 111 of the storage device 1 transmits the RTT UPIU for providing a notification of the receivable data size (buffer size) to the UFS layer 221 of the host 2 (S401), and receives the DATA OUT UPIU that is created and transmitted based on the RTT UPIU (S402). The UFS layer 111 separates the data (data+ EDC) contained in the DATA OUT UPIU into the data and the EDC (S403).

The W/R processing unit 121 of the storage device 1 stores the data in the data area of the page of the NAND memory 20 (S404). Further, the W/R processing unit 121 stores the EDC in the cache (RAM 13) (S405). The W/R processing unit 121 determines whether a fixed amount of EDC is accumulated in the cache (S406). The fixed amount is determined based on the number of EDCs that is collected in the data area of the NAND memory 20 page. When accumulated (S406: YES), the W/R processing unit 121 stores the EDC in the cache in the data area of the page of the NAND memory 20 (S407).

The UFS layer 111 of the storage device 1 determines whether the data of a size portion specified by the Expected Data Transfer Length of the COMMAND UPIU is received (S408). When the specified size portion is not reached (S408: NO), the UFS layer 111 executes the transmission of the RTT UPIU in step S401. When the specified size portion is reached (S408: YES), the UFS layer 111 transmits the RESPONSE UPIU to the UFS layer 221 of the host 2 (S411). As a result, the data write operation ends.

On the other hand, when a predetermined amount of the EDC is not accumulated in the cache (S406: NO), the UFS layer 111 determines whether the data of a size portion specified by the Expected Data Transfer Length of the COMMAND UPIU is received (S409). When the specified size portion is not reached (S409: NO), the UFS layer 111 executes the transmission of the RTT UPIU in step S401. When the specified size portion is reached (S409: YES), the W/R processing unit 121 stores the EDC in the cache in the data area of the page of the NAND memory 20 (S410). The UFS layer 111 transmits the RESPONSE UPIU to the UFS layer 221 of the host 2 (S411). As a result, the data write operation ends.

Figure 23:
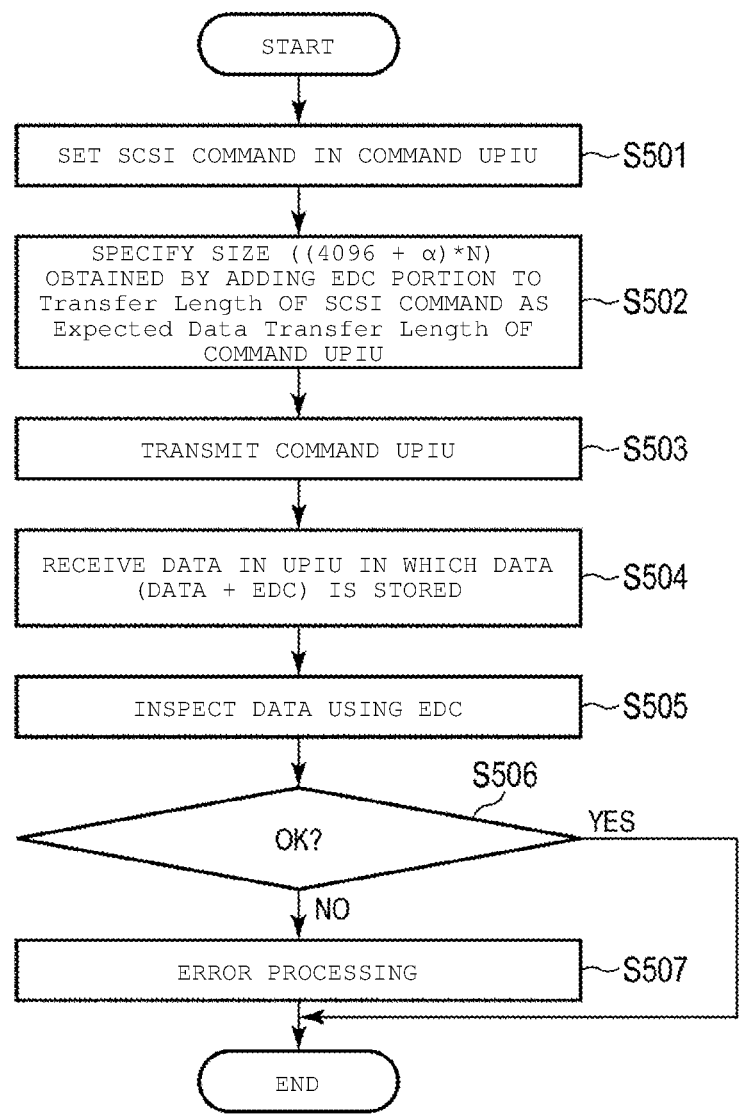
FIG. 23 is a flowchart illustrating an operating procedure of the host at the time of reading data.

FIG. 23 is a flowchart illustrating an operating procedure of the host 2 at the time of reading data.

The UFS layer 221 of the host 2 sets the SCSI command received from the SCSI layer in the COMMAND UPIU (S501). The UFS layer 221 specifies the size ((4096+α)×N) obtained by adding the EDC portion to the value of the Transfer Length of the SCSI command as the Expected Data Transfer Length of the COMMAND UPIU (S502).

The UFS layer 221 transmits the COMMAND UPIU to the UFS layer 111 of the storage device 1 (S503). After transmitting the COMMAND UPIU, the UFS layer 221 receives the DATA IN UPIU containing the data (data+EDC) from the UFS layer 111 of the storage device 1 (S504). The reception of the DATA IN UPIU can be executed a plurality of times.

The SCSI layer of host 2 inspects the data using the EDC (S505). When an error is detected (S506: NO), the SCSI layer executes, for example, error processing for providing a notification of the data requester of the error (S507). When the ECC is added instead of the EDC, the error processing is error correction. After the error processing, the read operation of the data ends. When no error is detected (S506: YES), the read operation of the data ends without going through the step S507.

Figure 24:
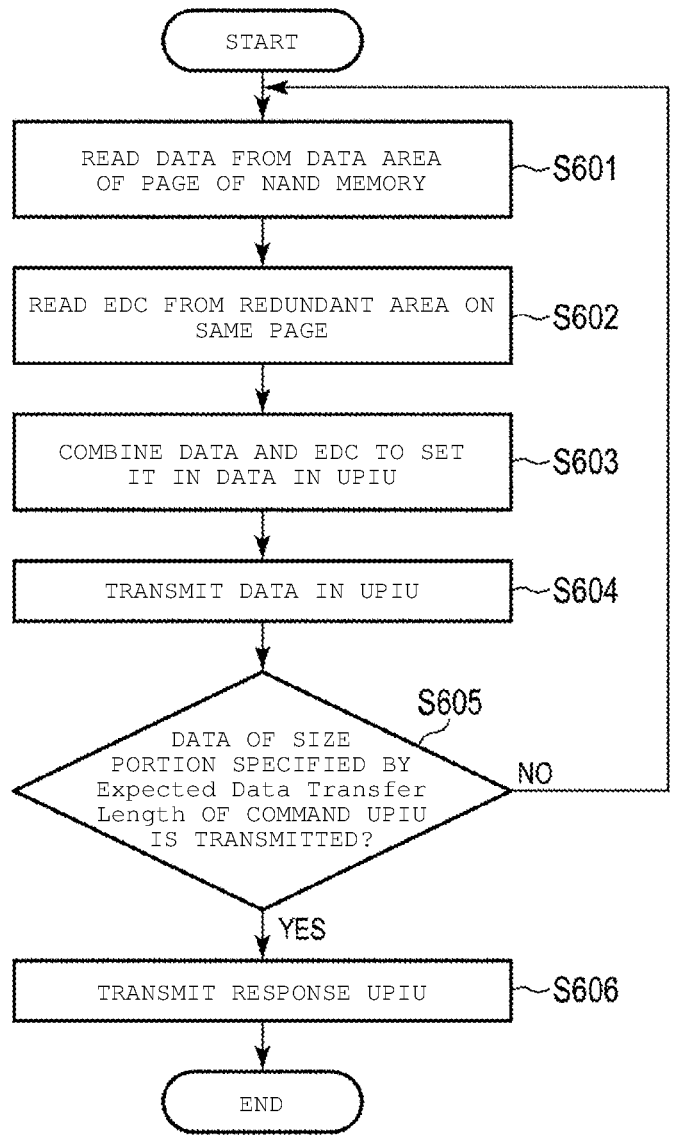
FIG. 24 is a first flowchart illustrating an operating procedure of the storage device at the time of reading data.

FIG. 24 is a first flowchart illustrating an operating procedure of the storage device 1 at the time of reading data. Similarly to at the time of writing data, the UFS layer 111 of the storage device 1 recognizes that the data to be read includes the EDC when the Transfer Length of the SCSI command and the Expected Data Transfer Length of the COMMAND UPIU do not match. FIG. 24 illustrates an operating procedure of the storage device 1 when it is recognized that the data to be read includes the EDC.

The W/R processing unit 121 of the storage device 1 reads the data from the data area of the page of the NAND memory 20 (S601). Further, the W/R processing unit 121 reads the EDC from the redundant area on the same page (S602). The read of the data of the step S601, and the read of the EDC in step S602 can be performed a plurality of times according to available storage size in the DATA IN UPIU.

The UFS layer 111 of the storage device 1 combines the data and the EDC to set the combination in the DATA IN UPIU (S603), and transmits the DATA IN UPIU to the UFS layer 221 of the host 2 (S604). The UFS layer 111 determines whether the data of a size portion specified by the Expected Data Transfer Length of the COMMAND UPIU is transmitted (S605). When the specified size portion is not reached (S605: NO), the W/R processing unit 121 executes the read of the data in the step S601 and the read of the EDC in the step S602. When the specified size portion is reached (S605: YES), the UFS layer 111 transmits the RESPONSE UPIU to the UFS layer 221 of the host 2 (S606). As a result, the read operation of the data ends.

Figure 25:
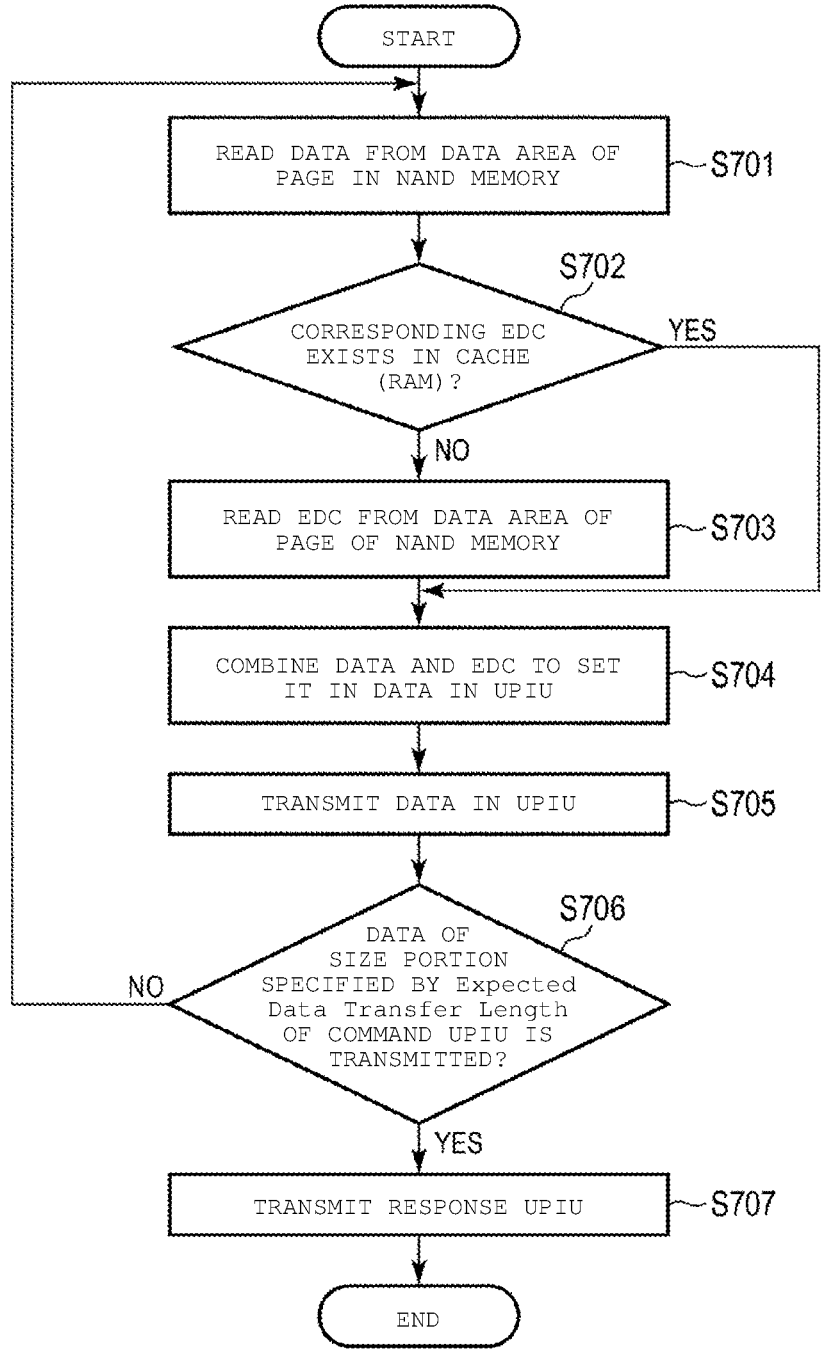
FIG. 25 is a second flowchart illustrating an operating procedure of the storage device at the time of reading data.

FIG. 25 is a second flowchart illustrating an operating procedure of the storage device 1 at the time of reading data. FIG. 25 illustrates another operating procedures of the storage device 1 when it is recognized that the data to be read includes the EDC.

The W/R processing unit 121 of the storage device 1 reads the data from the data area of the page of the NAND memory 20 (S701). The W/R processing unit 121 determines whether the EDC for the data exists in the cache (RAM 13) (S702). When the EDC for the data does not exist in the cache (S702: NO), the W/R processing unit 121 reads the EDC from the data area of the page of the NAND memory 20 (S703). When the EDC for the data exists in the cache (S702: YES), the step S703 is skipped. The read of the data in the step S701 can be performed a plurality of times according to a size of data that can be contained in the DATA IN UPIU.

The UFS layer 111 of the storage device 1 combines the data and the EDC to set the combination in the DATA IN UPIU (S704), and transmits the DATA IN UPIU to the UFS layer 221 of the host 2 (S705). The UFS layer 111 determines whether the data of a size portion specified by the Expected Data Transfer Length of the COMMAND UPIU is transmitted (S706). When the specified size portion is not reached (S706: NO), the W/R processing unit 121 executes the read of the data in the step S701. When the specified size portion is reached (S706: YES), the UFS layer 111 transmits the RESPONSE UPIU to the UFS layer 221 of the host 2 (S707). As a result, the read operation of the data ends.

As described above, in the information processing system 100 of the present embodiment, the data 101 is 4K byte and the EDC 102 having a size that is a fraction a less than 4K byte are both stored in the NAND memory 20 so that the write efficiency of the storage device 1 is not deteriorated. Furthermore, data (data 101+ EDC 102) having a size that is a multiple of (4K byte+α), which is distinct from a multiple of 4K byte, can be communicated between the host 2 and the storage device 1. That is, the information processing system 100 of the present embodiment can protect data over the entire data transmission path while preventing deterioration of the write efficiency.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A storage device, comprising:
a non-volatile memory including a plurality of pages, each of the pages including a data area of a first size and a redundant area of a second size smaller than the first size; and
a controller configured to:
receive, from a host, a write command specifying a logical address, the write command being in accordance with a first communication protocol and indicating a first transfer data length, the write command including a command portion configured in accordance with a second communication protocol and indicating a second transfer data length;

receive, from the host, transfer data associated with the write command, the transfer data including write data of the first size;
determine the write data in the transfer data is appended with a first error detection code for the write data when the first transfer data length is different from the second transfer data length;
store the write data into the data area of one of the pages and the first error detection code into the redundant area of the one of the pages;
transmit, to the host, a first transmittable data size that is equal to a multiple of a total of the first size and a size of the first error detection code when the first transfer data length is different from the second transfer data length, and a second transmittable data size that is equal to a multiple of the first size when the first transfer data length is equal to the second transfer data length; and
send the write data and the first error detection code to the host when receiving a read command specifying the logical address from the host.

2. The storage device according to claim 1, wherein the transfer data includes a second error detection code for data including the write data and the first error detection code.

3. The storage device according to claim 2, wherein the controller is further configured to perform an error detection of data including the write data and the first error detection code using the second error detection code.

4. The storage device according to claim 1, wherein the controller is further configured to generate a third error detection code for data including the write data and the first error detection code and store the third error detection code into the redundant area of the one of the pages.

5. The storage device according to claim 4, wherein the controller is further configured to read the write data from the data area of the one of the pages and the first and third error detection codes from the redundant area of the one of the pages, and then perform an error detection of data including the write data and the first error detection code using the third error detection code.

6. The storage device according to claim 1, wherein the transfer data includes a plurality of units of write data of the first size, each unit of which is appended with the first error detection code therefor.

7. The storage device according to claim 1, wherein the first error detection code comprises an error correction code.

8. The storage device according to claim 1, wherein the first communication protocol is according to Universal Flash Storage (UFS) and the second communication protocol is according to Small Computer System Interface (SCSI).

9. The storage device according to claim 1, wherein
the read command is in accordance with a first communication protocol, indicates a first transfer data length, and includes a command portion configured in accordance with a second communication protocol, the command portion indicating a second transfer data length, and
the controller is further configured to read the write data from the data area of the one of the pages and the first error detection code from the redundant area of the one of the pages, when the first transfer data length is different from the second transfer data length.

10. A storage device comprising:
a non-volatile memory including a plurality of pages, each of the pages including a data area of a first size and a redundant area of a second size smaller than the first size; and
a controller configured to:
receive, from a host, a write command specifying a logical address, the write command being in accordance with a first communication protocol and indicating a first transfer data length, the write command including a command portion configured in accordance with a second communication protocol and indicating a second transfer data length;
receive, from the host, transfer data associated with the write command, the transfer data including a plurality of units of write data of the first size;
determine each unit of the write data in the transfer data is appended with a first error detection code therefor when the first transfer data length is different from the second transfer data length;
store a first unit of the write data into the data area of a first one of the pages, a second unit of the write data into the data area of a second one of the pages, and the first error detection codes for the first and second units of the write data into the data area of a third one of the pages;
transmit, to the host, a first transmittable data size that is equal to a multiple of a total of the first size and a size of the first error detection code when the first transfer data length is different from the second transfer data length, and a second transmittable data size that is equal to a multiple of the first size when the first transfer data length is equal to the second transfer data length; and
send the plurality of units of write data and the first error detection codes therefor to the host when receiving a read command specifying the logical address from the host.

11. The storage device according to claim 10, wherein the transfer data includes a second error detection code for data including the first unit of the write data and the first error detection code therefor.

12. The storage device according to claim 11, wherein the controller is further configured to perform an error detection of the data including the first unit of the write data and the first error detection code therefor using the second error detection code.

13. The storage device according to claim 10, wherein the controller is further configured to generate a third error detection code for data including the first unit of the write data and the first error detection code therefor and store the third error detection code into the redundant area of the first one of the pages.

14. The storage device according to claim 13, wherein the controller is further configured to:
read the first unit of the write data from the data area of the first one of the pages, the first error detection code for the first unit from the data area of the third one of the pages, and the third error detection code from the redundancy area of the first one of the pages; and
then perform an error detection of data including the first unit of the write data and the first error detection code therefor using the third error detection code.

15. The storage device according to claim 10, wherein
the read command is in accordance with a first communication protocol, indicates a first transfer data length, and includes a command portion configured in accordance with a second communication protocol, the command portion indicating a second transfer data length, and
the controller is further configured to read the first unit of the write data from the data area of the first one of the pages and the first error detection code from the data area of the third one of the pages, when the first transfer data length is different from the second transfer data length.

16. A host, comprising:

a communication interface communicable with a storage device; and a host controller configured to:

control the communication interface to transmit a write command including information indicating that data to be sent is appended with a first error correction code, the write command being in accordance with a first communication protocol and indicating a first transfer data length, the write command including a command portion configured in accordance with a second communication protocol and indicating a second transfer data length;

after the write command is transmitted, control the communication interface to transmit transfer data including write data of a first size, the first error detection code for the write data, and a second error detection code for data including the write data and the first error detection code therefor;

receive from the storage device, a first transmittable data size that is equal to a multiple of a total of the first size and a size of the first error detection code when the first transfer data length is different from the second transfer data length, and a second transmittable data size that is equal to a multiple of the first size when the first transfer data length is equal to the second transfer data length; and after the transfer data is transmitted, control the communication interface to transmit a read command specifying the logical address.

* * * * *